US011017422B2

(12) United States Patent
Smith et al.

(10) Patent No.: US 11,017,422 B2
(45) Date of Patent: May 25, 2021

(54) DYNAMICALLY GENERATING DIGITAL PRODUCT NOTIFICATIONS OVER TIME BASED ON PRODUCT EXPIRATION DATA

(71) Applicant: Adobe Inc., San Jose, CA (US)

(72) Inventors: Kevin Smith, Lehi, UT (US); Cameron Michaelson, Heber City, UT (US)

(73) Assignee: ADOBE INC., San Jose, CA (US)

( * ) Notice: Subject to any disclaimer, the term of this patent is extended or adjusted under 35 U.S.C. 154(b) by 337 days.

(21) Appl. No.: 15/909,714

(22) Filed: Mar. 1, 2018

(65) Prior Publication Data

US 2019/0272557 A1 Sep. 5, 2019

(51) Int. Cl.
| | | |
|---|---|---|
| *G06Q 30/02* | (2012.01) | |
| *G06Q 10/08* | (2012.01) | |
| *G06F 17/18* | (2006.01) | |
| *G06N 20/00* | (2019.01) | |
| *G06N 3/08* | (2006.01) | |
| *H04W 4/021* | (2018.01) | |

(52) U.S. Cl.
CPC ......... *G06Q 30/0224* (2013.01); *G06F 17/18* (2013.01); *G06N 3/08* (2013.01); *G06N 20/00* (2019.01); *G06Q 10/087* (2013.01); *H04W 4/021* (2013.01)

(58) Field of Classification Search
CPC .. G06Q 30/0224; G06Q 10/087; G06N 20/00; G06N 3/08; G06N 7/005; G06F 17/18; H04W 4/021
USPC .......................... 705/80, 14.23, 14.35, 14.51
See application file for complete search history.

(56) References Cited

U.S. PATENT DOCUMENTS

| | | | | |
|---|---|---|---|---|
| 2009/0222337 A1* | 9/2009 | Sergiades | ........... | G06Q 30/0239 705/14.23 |
| 2010/0280960 A1* | 11/2010 | Ziotopoulos | ....... | G06Q 30/0223 705/80 |
| 2015/0317667 A1* | 11/2015 | Wohlert | ............. | G06Q 30/0235 705/14.35 |

FOREIGN PATENT DOCUMENTS

WO WO-2012047240 A1 * 4/2012 ......... G06Q 30/0202

OTHER PUBLICATIONS

Jill Cataldo, Coupon Queen: Why do coupons have to expire, 2010 (Year: 2010).*

* cited by examiner

*Primary Examiner* — Tarek Elchanti
(74) *Attorney, Agent, or Firm* — Keller Jolley Preece

(57) ABSTRACT

Methods, systems, and non-transitory computer readable storage media are disclosed for dynamically generating discounted product digital notifications based on remaining product shelf life. For example, in one or more embodiments, the disclosed system determines an expiration date or a target product available for purchase from a merchant. Additionally, in one or more embodiments, the disclosed system utilizes a machine-learning model to dynamically generate discount prices for the target product over time based on the expiration date. In one or more embodiments, the disclosed system identifies a client device of a customer and provides a discount price for the target product for a given time window to the client device of the customer.

20 Claims, 10 Drawing Sheets

DYNAMICALLY GENERATING DIGITAL PRODUCT NOTIFICATIONS OVER TIME BASED ON PRODUCT EXPIRATION DATA

BACKGROUND AND RELEVANT ART

Recent years have seen significant development in computer hardware and software solutions for managing merchant inventory. Indeed, conventional computing systems can automatically track remaining inventory, order inventory, and determine inventory prices for brick and mortar retail establishments. For example, conventional computing systems can track inventory of products within a product category, determine a number of remaining products within the product category, automatically order new products based on remaining inventory levels, and set prices for products as they are ready for sale.

Although conventional digital inventory management systems can automatically manage inventory for brick and mortar establishments, such systems have a number of significant shortcomings. Indeed, conventional digital inventory management systems are often inefficient, rigid, and inaccurate. For example, such conventional systems are often inefficient in that they expend significant computing resources and result in significant waste. To illustrate, although conventional inventory systems utilize a large amount of processing power to manage inventory, these systems often cause considerable waste associated with discarding unsold, expired products. Indeed, one of the most significant expenses associated with merchant entities utilizing conventional inventory management systems is waste from expired products.

In addition, conventional inventory management systems are also rigid. For example, conventional inventory management systems for brick and mortar establishments generally set a static price for products in product categories based on a rigid set of underlying inventory data, such as available inventory and inventory purchase price. Thus, for example, with regard to expiring products, many inventory management systems apply generalized discounts to products in a sale rack/shelf with a rigid "one-size-fits-all" approach. This rigid approach is not scalable and contributes to the inefficiencies and waste of conventional digital inventory management systems Furthermore, conventional inventory management systems are often inaccurate. In particular, although conventional systems can automatically determine prices for inventory, they often fail to accurately (and flexibly) determine prices that reflect value of individual products within product categories. Thus, for example, with regard to expiring products, the rigid "one-size-fits-all" approach described above results in inaccurate pricing for individual products that each have a unique value. The inaccuracies of conventional systems further contribute to inefficiency and waste as consumers are unwilling to purchase individual products inaccurately priced to reflect their actual value.

These and other disadvantages exist with respect to conventional digital inventory management systems.

SUMMARY

One or more embodiments provide benefits and/or solve one or more of the foregoing or other problems in the art with systems, methods, and non-transitory computer readable storage media for dynamically generating digital discounted product notifications over time based on product expiration data. In particular, the disclosed systems can use information about the expiration dates of products available for purchase from a merchant to generate discount prices for the products over time as the remaining shelf life changes. Moreover, the disclosed systems can dynamically generate specific discount prices customized to individual users and provide customized digital notifications. For example, the disclosed systems can utilize product history data and customer history data to dynamically generate customized discount prices for individual users. The disclosed systems can thus utilize past product and customer data to flexibly and accurately provide price discounts through digital notifications that change over time as product value changes based on expiration data.

To illustrate, in one or more embodiments, disclosed systems utilize a machine-learning model to generate discount prices for a particular customer based on customer data for the customer. The disclosed systems can identify a client device of the customer associated with the merchant within a time window and provide an individualized discount price corresponding to the time window to the client device of the customer. By using a machine-learning model to analyze customer data in light of past product and customer data, the disclosed systems can provide accurate and efficient customized product discounting and digital notifications for a wide range of products and for a variety of customers with different incentive thresholds.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which.

DETAILED DESCRIPTION

Figure 1:
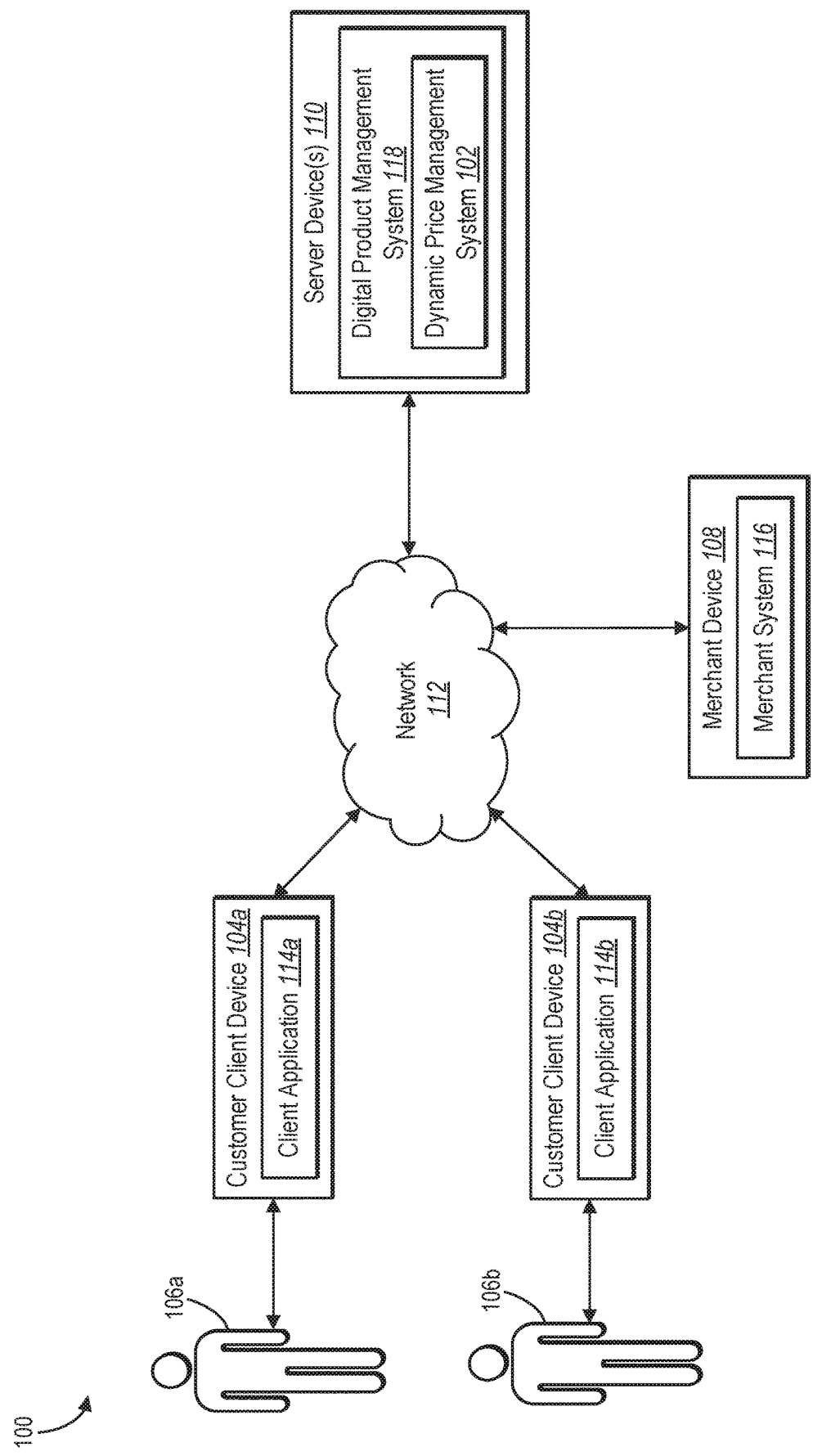
FIG. 1 illustrates an environment in which a dynamic price management system can operate in accordance with one or more embodiments.

One or more embodiments of the present disclosure include a dynamic price management system that intelligently and dynamically generates digital product notifications reflecting discount prices over time based on product expiration data. Specifically, the dynamic price management system can utilize a machine-learning model (e.g., neural network or regression model) to analyze product data associated with a target product to generate a discount price for a customer based on the expiration date of the target product. Additionally, the dynamic price management system can utilize the machine-learning model to analyze customer data associated with one or more customers to further tailor a generated discount price and customized digital product notification to a customer. By generating and utilizing a machine-learning model based on the product data and customer data, the dynamic price management system can determine a discount price for the target product based on product expiration data, and improve the accuracy, flexibility, and efficiency of implementing computing systems.

To illustrate, in one or more embodiments, the dynamic price management system (or simply "price management system") analyzes historical data, including historical product expiration data, for products previously available for purchase from a merchant and for customers associated with the merchant to determine correspondences between product details, product expiration data, and customer preferences. The price management system can then determine an expiration date for a target product and utilize a machine-learning model trained using the historical data to generate a prediction of a sale of the target product at a discount price based on the expiration date. In particular, the price management system can dynamically generate, for the target product, probabilities that one or more customers will purchase the target product at various discount prices relative to the expiration date of the target product. Furthermore, based on the generated probabilities, the price management system can provide a digital notification of a discount price to a client device of a customer. Alternatively, the price management system can provide a discount price to a customer via one or more other devices, such as a digital price tag, scanner device, checkout device, or other device capable of providing digital notifications to a customer.

As mentioned, the price management system can analyze product history data (including historical expiration data) and customer history data to generate and provide discount prices for a product based on an expiration date of the product. Specifically, in one or more embodiments, the price management system trains a machine-learning model using product history data for previously available products and customer history data for a plurality of customers associated with a merchant. The price management system can utilize the machine-learning model (e.g., neural network or regression model) to output sale predictions for a product with a particular expiration date and then train the machine-learning model based on a comparison between the output sale predictions and ground truth sales information.

Also, as mentioned, the price management system can utilize the trained machine-learning model to generate probabilities of a customer purchasing a target product with an expiration date at a specific price. In particular, in one or more embodiments, the price management system identifies product data for a target product (e.g., an expiration date of the target product and other features of the target product) and provides the product data as input to the trained machine-learning model. Additionally, in one or more embodiments, the price management system identifies customer data for a customer associated with the merchant and provides the customer data as input to the trained model. The price management system can then use the trained machine-learning model to generate probabilities indicating whether the customer is likely to purchase the product at a plurality of possible discount prices in light of the expiration date and then determine a discount price for the customer based on the probabilities.

In one or more embodiments, the price management system generates a customized discount price specific to a given customer based on expiration data of one or more products (e.g., a discount price for the customer optimized to the remaining shelf life reflected by the expiration date). Specifically, the price management system can use customer data for the given customer as input to the trained machine-learning model to create a customized price that targets the specific customer in light of expiration data for a particular product. For example, the price management system can use information about the customer's past purchasing habits and other features of the customer's habits or demographics to determine a tailored pricing model for the customer based on a product expiration date. The tailored pricing model allows the price management system to generate discount prices for the customer over time based on the remaining shelf life and the customer's characteristics, purchasing habits, and interests. Likewise, the price management system can use customer data for other customers to determine different tailored pricing models for the other customers in light of expiration data for various products.

In one or more embodiments, the price management system executes a tailored pricing model for a customer by generating customized discount prices based on expiration data of a product and providing the customized discount prices to the customer in response to determining an interest of the customer in a product. In particular, the price management system can collect information (e.g., location data, browsing data) from a client device of a customer to determine that the customer is interested in at least one product with an upcoming expiration date available for purchase from a merchant. The price management system can then generate and provide one or more discounted prices to a computing device for display to the customer in accordance with the customer's interest based on the expiration date.

The price management system can generate and provide a variety of digital notifications to client devices associated with the customer to provide discounted prices for products based on expiration data. For example, in one or more embodiments, the price management system provides digital notifications of a product having an upcoming expiration date to a smartphone of a client device upon detecting that the smartphone has crossed a geo-fence corresponding to a merchant establishment. Similarly, in one or more embodiments, the price management system can provide a digital notification of a product having an upcoming expiration date via a computing device at a check-out location upon detecting that a customer is purchasing a similar product with an expiration date that is not as recent. Accordingly, the price management system can provide a variety of digital notifications in response to a variety of triggering events based on expiration data corresponding to one or more products.

Furthermore, the price management system can dynamically determine discounted prices and provide corresponding digital notifications over time. For example, the price management system can determine dynamic (e.g., sliding or variable) discounted prices corresponding to different time periods as a product comes closer and closer to an expiration date. The price management system can also dynamically provide different digital notifications to different customers with various discounted prices over time. In this manner, the price management system can modify discounted prices and provide corresponding digital notifications to client devices of customers (in real-time) to reduce wasted resources.

As mentioned, the price management system provides a number of advantages over conventional systems. For example, the price management system can improve the accuracy and efficiency of computing systems implementing product and inventory management merchants. In particular, the price management system can more accurately generate discounted prices that reflect actual value of a product according to the remaining shelf life. Moreover, the price management system can generate tailored discount prices and digital notifications that accurately reflect value of products to specific customers. The price management system can also reduce waste and inefficiencies relative to conventional systems. Indeed, the price management system can increase accuracy and efficiency of managing inventory inflow and outflow while reducing waste.

In addition, the price management system further improves flexibility of computing devices implementing product management and price management for products. For instance, in contrast to a "one-size-fits-all" approach utilized by conventional systems, the price management system can dynamically generate and provide digital notifications reflecting a variety of different discounted prices, for a variety of different products, for a variety of different customers, at a variety of different locations, over time. Indeed, the price management system can provide digital notifications of different discounted prices as a product nears an expiration date, for different customers, or for different products within the same product category, for different locations of a merchant. To illustrate, the price management system can flexibly determine a discount price per product at specific day parts per merchant location across all customers (or groups of customers) that frequent the merchant location during similar times.

The price management system can also improve flexibility by exploring and utilizing interactions between a variety of different characteristics to determine different discount prices rather than limited, specific rigid categories. For example, the price management system can utilize a machine-learning model (e.g., neural network or regression model) to automatically identify significant features based on combined interaction between product data (e.g., data from merchants indicating inventory, sale history, and expiration dates) and customer data (e.g., data from a user data profile such as demographics and purchasing history). Indeed, the price management system can train a machine-learning model, such as a neural network, to identify the features that most indicate likelihood of a sale of a product at a given price relative to the expiration date of the product. Moreover, the price management system can analyze a variety of flexible data sources to identify these features, including offline data, merchant data, in-store IoT based behavioral data (internet of things behavioral data, such as location or movement of shopping carts, opening/closing of freezer doors, interaction with shelving, etc.), online behavioral and profile data (e.g., current shopping list, shopping propensities, spending habits), or audience segments. The price management system can train the model to recognize features of individual customers and groups of customers that indicate whether the customers are more likely or less likely to purchase products at certain prices over the life of the products.

Additionally, the price management system can automatically incorporate up-to-date (e.g., real-time) digital data regarding customers in identifying significant features. For example, as the price management system detects additional product data (including expiration data) and customer data, the price management system can update training of the machine-learning model to identify any additional, or alternative features. Thus, for instance, the price management system can analyze product sales data (indicating a sale or lack thereof) from a merchant for a previous day before generating customized discount prices for a customer. The price management system can implement such improvements among different products, among different stores, and even among different merchants. Accordingly, the price management system can not only automatically identify significant features for developing pricing models and generating customized discount prices for individual customers (or groups of customers, which can save on processing power/time), but can automatically modify which features the system determines to be significant (in real-time) base on additional product data.

Furthermore, the price management system also improves flexibility by providing discount prices for products to client devices of customers in real-time (e.g., through a mobile app in response to detecting the customer's interest in the products). For instance, as mentioned above, the price management system can detect a customer's interest based on location data from the customer's client device (e.g., a location within a store relative to a product). Thus, the price management system can provide customized discount prices to a customer when they are most relevant to the customer.

As illustrated by the foregoing discussion, the present disclosure utilizes a variety of terms to describe features and advantages of the price management system. Additional detail is now provided regarding the meaning of such terms. For example, as used herein, the term "product" refers to a good for sale by a merchant. Products can include perishable goods such as foods, medications, or other goods that expire after a certain date as determined by a creator of the product or based on regulatory guidelines. Products can include non-perishable goods such as clothing or other items that do not have a specific date at which the goods expire. Non-perishable goods, however, can have a date or range of dates at which the merchant considers the goods to be "out of date" (e.g., dates at which the merchant will stop selling the products). Thus, as used herein, the term "expiration date" refers to a date at which a merchant will stop selling a product item, whether the product item is perishable or non-perishable.

As used herein, the term "product category" refers to a type of product that includes a plurality of product items. For example, a product category can include a specific brand of milk sold by the gallon. In another example, a product category can include a brand of t-shirt with a specific design. As used herein, the term "target product" refers to a specific product (e.g., that a merchant sells, or seeks to sell, at a discount price based on expiration date). A target product includes a specific product unit within a product category having an expiration date (or a group of product units having the same expiration date within the product category). For instance, a target product in a milk product category can include a specific gallon of milk. To illustrate, a target product includes a specific product unit with a specific expiration date (e.g., a gallon of milk that expires on a specific date). Alternatively, a target product includes one of a plurality of product units with the same expiration date (e.g., gallons of milk that expire on the same date that a merchant seeks to sell at a discount price).

As used herein, the term "discount price" refers to a price of a product that is less than an original price of the product. For instance, a discount price can include a price at which a merchant sells a target product by lowering the price from an original price of the target product (e.g., when the merchant first began selling the target product). In particular, a merchant can sell a target product at a discount price to incentivize customers to purchase the target product before the expiration date of the target product.

As used herein, the term "merchant" refers to an entity that provides products for sale to a plurality of customers. A merchant can include an online entity that sells products via a webpage or an entity that includes a physical location (e.g., a brick-and-mortar store) for selling products to customers at the physical location. In at least some instances, a merchant sells products to customers via an online presence and one or more physical locations. Thus, a merchant may manage an inventory at one or more physical locations for customers to view in-store and an inventory for online purchases (e.g., within one or more warehouses).

As used herein, the term "product data" refers to descriptive information of a product and information associated with sales of the product. In particular, product data can include information that allows the price management system and the merchant to identify the product. For instance, product data can include, but is not limited to, a product category, an expiration date, price information (e.g., current prices of products in the product category, a price history indicating a history of prices for products in the product category), sale/purchase information, inventory data, and location/store information. As used herein, the term "product history data" refers to historical product data associated with previously available products or previously sold products in a product category, including a purchase history for other products in the product category. Additionally, product history data can refer to global product history data associated with products at a plurality of stores of a merchant (e.g., globally across all stores of the merchant) or to local product history data associated with one or more stores in a subset of a plurality of stores of the merchant (e.g., one or more stores within a specific region, and separately from store(s) in another region). As used herein, the term "purchase history" refers to a history of purchases of products in a product category by one or more customers.

As used herein, the term "customer data" refers to descriptive information of a customer associated with a merchant. Specifically, customer data can include, but is not limited to, purchasing habits (e.g., frequency, recency), price sensitivity (i.e., how heavily a customer is influenced by price), consumption rate, demographic information, family size, family details (e.g., number/age of children), gender, and/or location. As used herein, the term "customer history data" refers to historical customer data associated with a plurality of customers associated with a merchant. As with product history data, the customer history data can refer to global customer history data associated with customers globally (e.g., all customers of the merchant) or to local customer history data associated with customers within a specific region, and separately from customers in another region.

Also as used herein, and as described in greater detail below, a "machine-learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, regression models, Bayesian networks, random forest learning, dimensionality reduction algorithms, boosting algorithms, artificial neural networks, deep learning, etc. Thus, a machine-learning model makes high-level abstractions in data by generating data-driven predictions or decisions from the known input data.

As used herein, the term "neural network" (or "artificial neural network") refers to an artificial machine-learning model that learns tasks by analyzing example data utilizing a plurality of layers that analyze features of the example data at different levels of abstraction. In particular, the term "neural network" can include a model of interconnected digital neurons that communicate and learn to approximate complex functions and generate outputs based on a plurality of inputs provided to the model. For instance, the term "neural network" includes convolutional neural networks, fully convolutional neural networks, or deep neural networks. Neural networks also include feedforward neural networks or recurrent neural networks. Specifically, a neural network can train itself using product history data (and in some cases customer history data) to identify whether products with specific expiration dates sold at specific prices. The neural network can then make predictions of whether other products will sell at specific prices based on expiration data.

Additionally, as used herein, the term "regression model" refers to a computer model that utilizes statistical regression analysis to analyze inputs and estimating relationships between features or variables from the inputs. The regression model then generates outputs based on the estimated relationships.

Referring now to the figures, FIG. 1 illustrates an embodiment of an environment 100 in which a dynamic price management system 102 can operate. In particular, the environment 100 includes customer client devices 104*a*, 104*b* associated with customers 106*a*, 106*b*, a merchant device 108, and server device(s) 110. One or more of the components may be in communication via a network 112. Moreover, as shown, the customer client devices 104*a*, 104*b* include client applications 114*a*, 114*b*, and the merchant device 108 includes a merchant system 116. Furthermore, the server device(s) 110 include a digital product management system 118, which includes the dynamic price management system 102 to dynamically generate discount prices for products over time based on expiration dates of the products.

In one or more embodiments, the merchant device 108 includes a computing device capable of performing operations associated with managing product inventory and prices of products. For example, the merchant device 108 can include a smartphone, tablet, desktop computer, laptop computer, check-out device or other device that is able to access the price management system 102 via the network 112. Additionally, the merchant device 108 can communicate with, and obtain information from, the customer client devices 104*a*, 104*b* in connection with providing products to the customers 106*a*, 106*b*. As mentioned, the merchant device 108 can include the merchant system 116, which can include software and/or hardware for communicating with the server device(s) 110 to provide and obtain information related to product and price management operations described herein.

As described in more detail below, the customer client devices 104a, 104b include computing devices capable of receiving and displaying product data associated with products available for purchase from a merchant. For example, each of the customer client devices 104a, 104b can include a smartphone, tablet, desktop computer, laptop computer, or other device that is able to communicate with the merchant system 116 via the network 112. The customer client devices 104a, 104b can include software (e.g., an application such as a merchant-specific application or a web browser) that allows the customers 106a, 106b to view products available for purchase from a merchant. The software can also display customized discount prices for the customers based on information provided by the customer client devices 104a, 104b to the merchant system 116 and/or to the price management system 102.

According to one or more embodiments, the digital product management system 118 allows a merchant to manage a product inventory. For example, a merchant can access the digital product management system 118 via the network 112 to manage a plurality of products in a product inventory for one or more physical stores and/or an online store. In particular, a product inventory can include a plurality of products across one or more product categories, including perishable and/or non-perishable products. Thus, a merchant can use the merchant device 108 to access the digital product management system 118 to track inflow and outflow of products in the product inventory as the merchant sells or otherwise removes products from purchase availability and replaces sold products with new products (e.g., products in the product category or products in a new product category). The digital product management system 118 can provide information indicating how many products are currently in stock, how many products are incoming, expiration dates of the products, and sales information associated with products and product categories.

Furthermore, in one or more embodiments, the dynamic price management system 102 (or simply "price management system 102") allows the merchant to manage product prices in the product inventory. In particular, the price management system 102 includes a machine-learning model to dynamically generate discount prices based on the expiration dates of products. Additionally, the price management system 102 can use the model to dynamically generate discount prices for products. Dynamically generating discount prices can include analyzing historical product/customer data to determine significant features of the products/customers and then using significant features to generate a discount price for a target product based on expiration data for the product to provide to one or more specific customers (e.g., via the customer client devices 104a, 104b).

In one or more embodiments, the price management system 102 facilitates the management and dynamic generation of product prices based on expiration data by obtaining and analyzing product information associated with products in a product inventory. For instance, the price management system 102 can obtain (e.g., from the merchant system 118) product history data indicating product purchase information, expiration dates, and other information associated with products previously available for purchase from the merchant. Furthermore, the price management system 102 can obtain product data for currently available products for use in generating dynamic discount prices over time for the currently available products to provide to one or more customers. Additionally, the price management system 102 can obtain customer history data indicating past customer purchase habits of a plurality of customers. In at least some instances, the price management system 102 provides tools that allow the merchant (e.g., an administrator user) to view the product history data and customer history data.

While, in at least some embodiments, the price management system 102 obtains product information (i.e., product data and product history data) and customer information from the merchant system 118, in other embodiments, the price management system 102 collects the product and customer information. In particular, the merchant can communicate with the price management system 102 to implement product and price management for the merchant by monitoring product inventory and purchases by customers associated with the merchant. The price management system 102 can also collect and store additional information about the customers, including personal or demographic information. In one or more embodiments, the price management system 102 collects customer information from the merchant system 118 and/or from one or more additional systems that utilize internet of things (IoT) devices, offline data, store data, third-party data, online behavioral and profile data, or other sources of data about customers to build customer profiles of individual customers or groups of customers for use in customizing discount prices to individual customers or groups of customers. Specifically, by building customer profiles based on the information from various sources, the price management system 102 is able to more accurately identify interests and habits of customers for training and utilizing a machine-learning model, as described in more detail below.

In one or more embodiments, the price management system 102 manages product inventories for a plurality of merchants. For example, the price management system 102 can communicate with a number of different merchant systems via the network 114 to manage one or more product inventories for each of the merchant systems. To illustrate, the price management system 102 can store product/customer data for each merchant system separately from other merchant systems to provide product and pricing management for each merchant individually. Alternatively, the price management system 102 can store product/customer data for each merchant system and combine the product/customer data to provide pricing management for the merchants, collectively. Accordingly, the price management system 102 can share the product/customer data across the merchants or maintain the product/customer data separate for each merchant.

To dynamically generate discount prices for products of the merchant corresponding to the merchant device 108, the price management system 102 includes a trained model to generate discount prices for one or more products to provide to customer(s), as mentioned previously. For example, the price management system 102 can provide customized prices to the customers 106a, 106b. In one or more embodiments, the price management system 102 provides discount prices to the customer client devices 104a, 104b associated with the customers 106a, 106b. To illustrate, the price management system 102 can provide the discount prices for presentation within client applications 114a, 114b at the customer client devices 104a, 104b.

Furthermore, the price management system 102 can provide a dynamically generated discount price in response to detecting an interest of a customer in a product. Specifically, the price management system 102 can communicate with the customer client devices 104a, 104b to obtain information indicating interest of the customers 106a, 106b in one or more products. The price management system 102 can then provide discount price(s) that the system 102 dynamically generates for the one or more products to the customer client devices 104a, 104b. As described in more detail below, the price management system 102 can generate a discount price that is applicable to more than one customer. Additionally, the price management system 102 can generate more than one discount price for a single product to provide to different customers (e.g., a first discount price to customer client device 104a and a second discount price to customer client device 104b).

Although the environment 100 of FIG. 1 is depicted as having various components, the environment may have any number of additional or alternative components (e.g., any number of server devices, customer client devices, merchant devices, or other components in communication with the price management system 102). Accordingly, the price management system 102 can utilize information for any number of merchants and merchant systems to generate dynamic discount prices to provide to any number of customer client devices. Furthermore, while one or more embodiments of the price management system 102 provide customized discount prices to customer client devices, merchants can utilize the price management system 102 to apply customized discount prices to products using printed/physical price tags, digital prices tags, digital notifications via check-out devices, or otherwise present the discount prices for customers to see.

Figure 2:
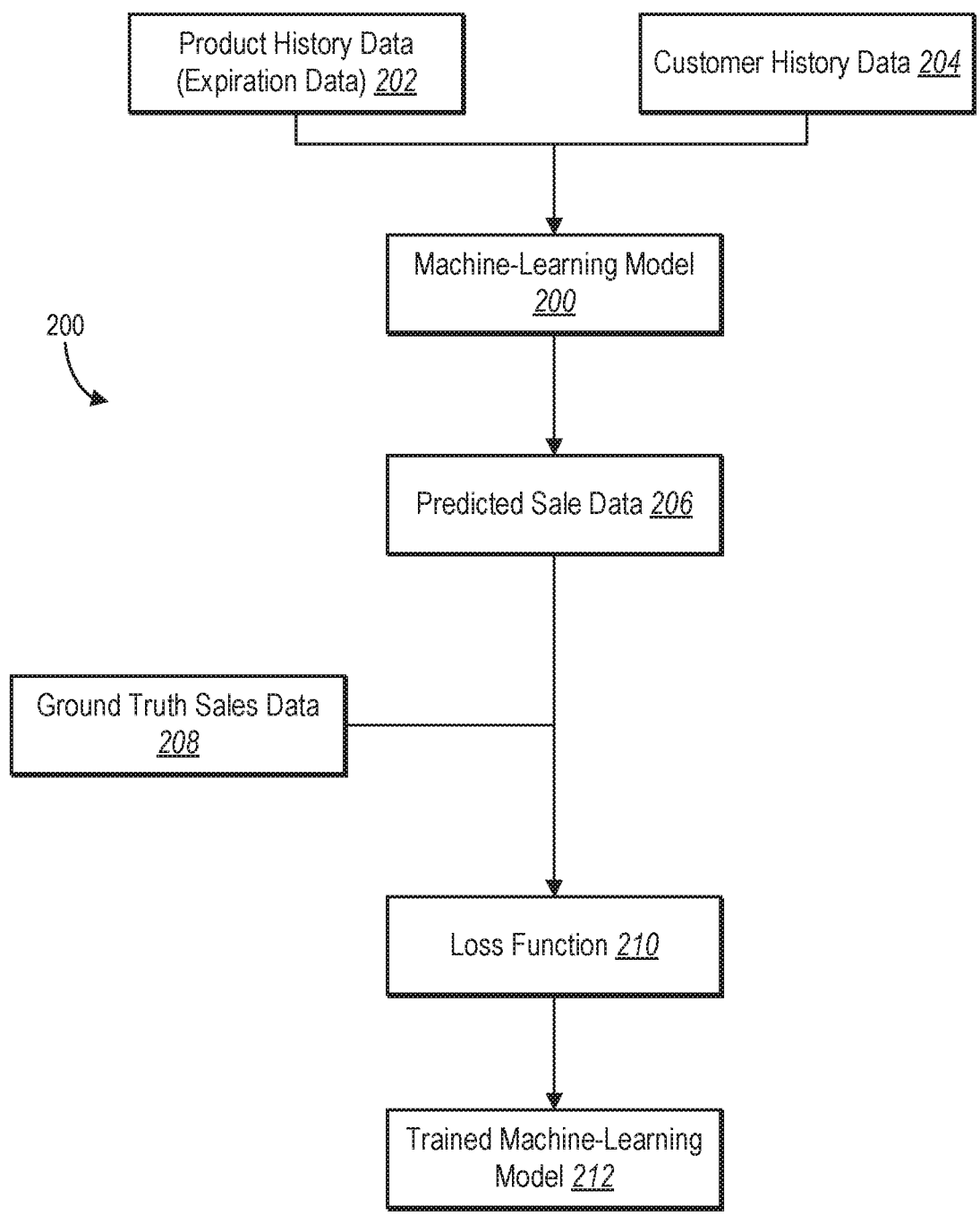
FIG. 2 illustrates a schematic diagram of training a machine-learning model, such as a neural network, for dynamically determining price discounts based on product and customer history data in accordance with one or more embodiments.

As mentioned previously, in one or more embodiments, the price management system trains and utilizes a machine-learning model to dynamically generate discount prices for products to provide to customers based on expiration data. FIG. 2 illustrates training a machine-learning model 200 (specifically, a neural network such as a convolutional neural network) for dynamically generating discount prices for a product over time based on an expiration date of the product. In one or more embodiments, training the machine-learning model 200 includes applying the machine-learning model 200 to product history data 202 (which includes historical information for a plurality of products corresponding to a merchant) and customer history data 204 (which includes historical information for a plurality of customers corresponding to the merchant). For example, the price management system 102 can access one or more repositories (e.g., from a merchant system associated with the merchant) that include the product history data 202 and the customer history data 204. In particular, the one or more repositories can include data collected for sold products, unsold products, and customers of the merchant. Applying the machine-learning model 200 to the product history data 202 and customer history data 204 allows the machine-learning model 200 to more accurately identify characteristics of customers that are more likely to purchase products at specific prices relative to the expiration dates of the products.

As shown in FIG. 2, the price management system 102 trains the machine-learning model 200 by generating the predicted sales data 206 for a plurality of products in a product inventory. For example, the price management system 102 utilizes the machine-learning model 200 to generate a prediction of whether a product in the product inventory sold. Specifically, the machine learning model 200 identifies a particular product and a specific price from the product history data 202 and analyzes features of the product to predict whether the product sold at the specific price.

As illustrated, the predicted sales data 206 can be based on the product history data 202 and the customer history data 204. For example, in addition to analyzing features of the particular product, the machine-learning model 200 can also analyze features of a particular customer in generating the predicted sales data 206. For example, the price management system 102 can provide information regarding a product, a sales price, and a customer to the machine-learning model 200. The machine-learning model can analyze features of the produce (including the sales price) and features regarding the customer and predict whether the customer purchased the product at the sales price.

Accordingly, by analyzing features and relationships of the product history data 202 and customer history data 204, the machine-learning model 200 can generate predicted sales data 206 for a product corresponding to the product history data 202. In one or more embodiments, the machine-learning model 200 determines a price for a product previously available for purchase from the merchant and then generates a predicted sale value (e.g., a "Yes" or "No" classification or other value representing a sale or non-sale of the product) for the product at the determined price. In one or more embodiments, the predicted sales data 206 also includes an amount of cost to the merchant based on whether a product sold at a given price. The machine-learning model 200 thus creates predicted sales data 206 for a plurality of products at a plurality of specific prices.

To verify the accuracy of the predicted sales data 206 for the products previously available products and train the machine-learning model 200, the price management system 102 utilizes ground truth sales data 208 for the plurality of products previously available for purchase from the merchant. Specifically, the ground truth sales data indicates whether the products actually sold at the given prices. More specifically, the ground truth sales data includes positive training data indicating products that sold and negative training data indicating products that did not sell. The ground truth sales data can also indicate a cost to the merchant resulting from a sale or non-sale of a product at a given price. Thus, the price management system 102 can compare the predicted sales data 206 to the ground truth sales data 208.

For instance, the machine-learning model 200 can determine the difference between the predicted sales data 206 and the ground truth sales data 208. In one or more embodiments, the price management system 102 determines the difference between the predicted sales data 206 and the ground truth sales data 208 by utilizing a loss function 210. The loss function 210 can compare the predicted sales data 206 and the ground truth sales data 208 and determine a measure of loss (i.e., a measure of difference or error). For instance, the loss function 210 can determine a loss for each predicted sale and the actual sale for a product. Accordingly, the loss function 210 determines whether the predicted sales data 206 is correct.

The price management system 102 uses the loss function 210 (e.g., the measure of loss resulting from the loss function 210) to train the machine-learning model 200. In particular, the price management system 102 can utilize the loss function 210 to correct parameters that resulted in incorrect predicted values from the predicted sales data 206. The machine-learning model 200 can use the loss function 210 to modify one or more weights or parameters. Specifically, the machine-learning model 200 modifies one or more weights or parameters within neural network layers (e.g., convolution layers within a convolution neural network) to minimize the loss function 210 and reduce the differences between the predicted sales data 206 and the ground truth sales data 208 for the previously available products. By minimizing the loss function 210, the machine-learning model 200 improves the accuracy of predicting whether a product will sell at a given price point for one or more customers. Additionally, adjusting the machine-learning model 200 based on the loss function 210 results in a trained machine-learning model 212.

By iteratively predicting sales data, comparing the sales data to ground truth sales data, and modifying internal parameters of the machine-learning model, the price management system 102 can determine significant features and relationships that accurately predict a sale. For example, for a product, the machine-learning model 200 learns features of, or relationships between, the product history data 202 (including the price(s) of the product and the expiration date of the product) and customer history data 204 to generate an accurate prediction of whether the product sold at the price(s). To illustrate, the machine-learning model 200 can learn purchase habits of the customers associated with the merchant to generate a prediction of whether a target product sold at a given price. Thus, for a given customer or customer demographic, the machine-learning model 200 can learn to determine whether the given customer or a customer within the customer demographic is likely to purchase a product at a price in connection with the remaining shelf life of the product.

In one or more embodiments, the price management system 102 can also provide a test dataset (e.g., a plurality of products) to allow the price management system 102 to verify the accuracy of the machine-learning model 200. For example, after training the machine-learning model 200 on the product history data 202 and the customer history data 204, the price management system 102 can use the test dataset to verify the accuracy of the model 200 at any time after training the machine-learning model 200.

Furthermore, as the price management system 102 generates predictions for sales of products still available and receives corresponding actual sales (e.g., as described in relation to FIG. 3), the price management system can continuously update (e.g., fine tune) the machine-learning model 200. For instance, the price management system 102 can generate predictions for products at various discount prices for one or more merchant locations and for one or more customers based on product data for the products and customer data for the customer(s). The price management system 102 can also receive actual sales data for the products after the products are sold (or expire). When the price management system 102 receives feedback corresponding to the predictions for the products, the machine-learning model 200 can use the feedback to update the loss function 210, and thus update the machine-learning model 200 itself.

As described above, the price management system 102 can train the machine-learning model 200 using product history data 202 and customer history data 204. While FIG. 2 illustrates training the machine-learning model 200 using product history data 202 and customer history data 204, in one or more embodiments, the price management system 102 trains the machine-learning model 200 using only product history data 202. Thus, the price management system 102 can also provide generalized product discount prices based on the product history data, rather than customized per customer or group of customers.

The price management system 102 can use any type of machine-learning techniques capable of predicting sales data for products to provide to one or more customers, including neural networks and/or regression models. For example, the machine-learning model 200 can include, but is not limited to, decision trees, support vector machines, linear regression, logistic regression, Bayesian networks, random forest learning, dimensionality reduction algorithms, boosting algorithms, deep neural networks, fully-connected neural networks, convolutional neural networks, or recurrent neural networks, deep learning, etc. In any case, the price management system 102 uses machine-learning techniques to continually train and update the machine-learning model 200 (or, in other words, to update the trained machine learning model 212) to produce accurate predictions of sales data for a product based on actual sales data for the products.

Figure 3:
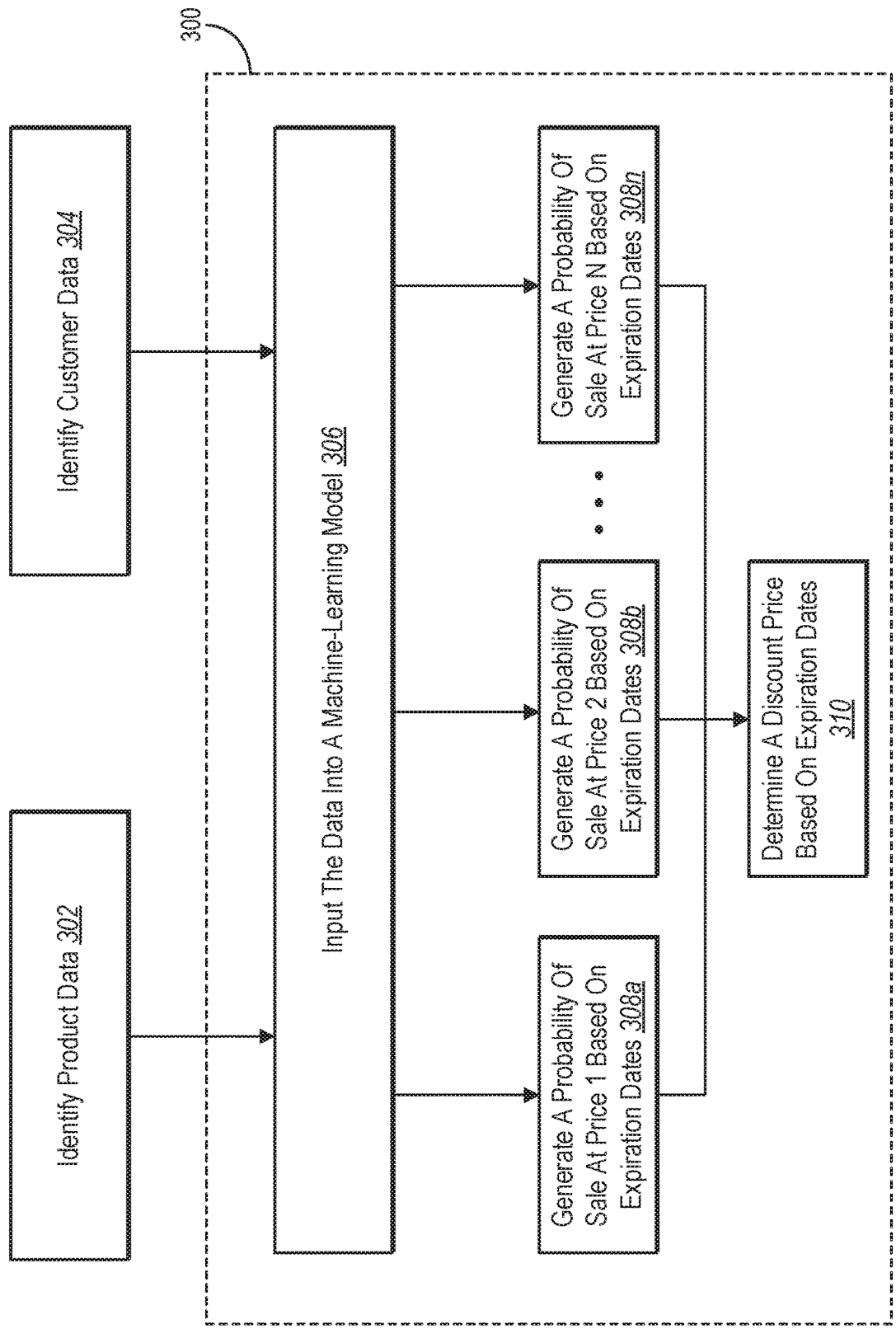
FIG. 3 illustrates a schematic diagram of utilizing a machine-learning model for dynamically determining price discounts for a target product based on product and customer history data for a customer in accordance with one or more embodiments.

As described above, the price management system 102 trains the machine-learning model 200 to predict whether a product will sell at one or more prices to one or more customers over time based on the remaining shelf life of the product. FIG. 3 illustrates a schematic diagram of determining a discount price for a target product based on the expiration date of the target product in accordance with one or more embodiments. As shown, the price management system 102 can perform an act 302 of identifying product data for a target product and an act 304 of identifying customer data. The price management system 102 can also perform an act 306 of inputting the data to a machine-learning model, acts 308a-308n of generating probabilities of sale at a plurality of different prices, and an act 310 of determining a discount price for the product.

As just mentioned, the price management system 102 can perform the act 302 of identifying product data. In particular, the price management system 102 can identify product data for a target product by accessing a repository that includes information about products available for purchase from a merchant. Identifying product data for the target product includes the price management system 102 determining an expiration date of the target product. As described previously, product data for a target product can include, but is not limited to, a product category of the target product, an expiration date/shelf life remaining for the target product, price information for the target product (e.g., standard price of the products in the product category, possible prices of the target product, cost of the target product to the merchant, prices of related product categories, whether the product is a well-known name brand), product description, whether the product is organic, product quality, inventory data (e.g., number of total products in the product category, number of products in related product categories), location information for where the target product is available (e.g., store locations), whether other stores nearby offer the target product, and sales information for products in the product category.

According to one or more embodiments, the price management system 102 can determine a remaining shelf life (e.g., based on determining an expiration date) of a target product. Specifically, the price management system 102 can access a database to identify a previously determined expiration date for the target product. Alternatively, the target product may not have a predetermined expiration date. Accordingly, the price management system 102 can dynamically determine the remaining shelf life using one or more processes to analyze the target product.

To illustrate, the price management system 102 can use image-based analysis (e.g., using in-store cameras, cameras on the customer client devices, UV imaging) to identify the remaining shelf life of the target product based on the appearance of the target product (e.g., by identifying brown spots, fluorescence, or other signs of aging on perishable products such as fruit). The price management system 102 can also use smell detectors that detect scents of aging products to determine a remaining shelf life. Furthermore, the price management system can use checkout scanners that determine an expiration date of the target product and/or to verify products and pricing of the target product. Checkout scanners can also allow the price management system 102 to track products and understand customer behavior and product inventory practices.

Furthermore, the price management system 102 can include an act 304 of identifying customer data. In one or more embodiments, the price management system 102 accesses a repository that includes information about customers associated with the merchant. The customer data can include customer data for a specific customer associated with the merchant (i.e., only one customer) for generating discount prices customized to an individual customer. Alternatively, the customer data can include customer data for a plurality of customers (e.g., customers within a specific demographic) for generating discount prices customized to a customer demographic, a particular day part (e.g., customers that visit a store at particular time), or for a particular store location. As mentioned, customer data can include purchasing habits in relation to products of the product category or related product categories (e.g., frequency of purchases, recency of purchases), price sensitivity (e.g., an aggregate score of how heavily a customer is influenced by price or brand, whether the customer uses coupons or offers, whether the customer purchases high end products), consumption rate (e.g., how quickly the customer can consume the product and whether the customer is likely to consume the product prior to the expiration date), demographic information, family size, family details (e.g., number/age of children), gender, and location. Thus, the price management system 102 can use the customer data to determine whether a customer (or group of customers) is likely to purchase a target product at a specific price and with a specific expiration date. The price management system 102 can also use the customer data to build customer profiles that correspond to an individual customer or groups of customers. Customer profiles can also allow the price management system 102 to target customers with related products (e.g., a plurality of products that a customer may use in a recipe). In an alternative example, the price management system 102 can use only product data (and be trained on only product history data) for generating dynamic discount prices to simplify the analysis and generalize the discount prices.

As mentioned, the price management system 102 can generate an aggregate score indicating a price sensitivity of a customer. In particular, the price management system 102 can generate a value representing each price sensitivity component (e.g., values for price influence, brand influence, coupon offer usage, high end product purchases, etc., on a scale). The price management system 102 can then generate an aggregate score by combining the values of the price sensitivity components, such as by adding or multiplying the values. The price management system 102 can also weight the values based on machine-learning or other analysis of the price sensitivity components to generate an aggregate score that most closely represents the price sensitivity of the customer.

In one or more embodiments, the price management system 102 identifies the product data and the customer data in response to, or in connection with, determining an interest (or potential interest) of a customer in a target product or in products within a product category. For instance, the price management system 102 can determine an interest of a customer in a target product based on data that a client device of the customer transmits to the price management system 102. In one example, the price management system 102 can receive location information from the client device of the customer indicating that the customer is at a store location of a merchant, which can further indicate that the customer may be interested in one or more products available for purchase at the store location.

The price management system 102 can also receive location information that indicates a precise or general location of the customer within the store location to determine that the customer is near a particular product. For example, the price management system 102 can maintain an in-store location of products. After determining the location of the customer (e.g., using a plurality of in-store location detectors to determine the location of the client device of the customer) within the store location, the price management system 102 can determine one or more products near the customer (e.g., within a geo-fence—or predetermined distance—of the customer or customer client device).

In other examples, rather than detecting the customer's location, the price management system 102 can use one or more devices to detect a location of a target product within the store. For instance, the price management system 102 can detect that a customer has added a product to a shopping cart using a smart cart that reads an RFID tag, code, or other identifier on the product. In another instance, the price management system 102 can detect that a customer is checking out to purchase a product by scanning a tag or code of the product using a checkout scanner or other device. The price management system 102 can then provide, in real-time, information about one or more other products in the product category or related product categories based on the determined interest.

Alternatively, the price management system 102 can determine a customer's potential interest in a target product or product category based on information associated with the customer's usage of an application on a client device of the customer. Specifically, the price management system 102 can determine that the customer is viewing information about a target product or product category on the client device of the customer. For instance, the price management system 102 can determine that the customer is viewing a page or interface (e.g., within a client application associated with the merchant or within a webpage of a web browser) that includes information about the target product or product category. Similarly, the price management system 102 can identify the product in a list of products (e.g., a digital shopping list) of the customer.

As shown in FIG. 3, the price management system 102 can also perform the act 306 of inputting the data into a machine-learning model. In particular, after identifying the product data and the customer data, the price management system 102 can input the product data and/or the customer data into a machine-learning model such as the model described in FIG. 2. The machine-learning model can use the product data and customer data to determine a discount price.

As shown in FIG. 3, the machine-learning model uses the product data and the customer data to generate probabilities that the product will sell at a plurality of different prices. Specifically, a trained machine-learning model can apply the learned relationships between product history data and customer history data to the product data and customer data of a target product. For example, the machine-learning model analyzes and processes the product data for the target product and customer data using algorithms and functions of the model that the price management system 102 tuned in relation to FIG. 2.

In one or more embodiments, after processing the input data, the machine-learning model outputs a plurality of probabilities associated with selling the target product. Indeed, as described above in relation to FIG. 2, the price management system 102 can generate a machine learning model trained to predict sales data (e.g., whether or not a product will sell at a particular product). The price management system 102 can utilize such a trained machine learning model to generate a probability of sale. For example, in embodiments where the trained machine learning model is a neural network, the price management system 102 can strip away the output layer (e.g., the classification layer for predicting a "yes" or "no" sale classification) and utilize the underlying probabilities generated by the neural network (e.g., the probabilities utilized by the neural network to determine whether a sale will occur). The price management system 102 can utilize the probability of a sale from the neural network to generate a probability of sale in relation to the acts 308a-308n.

As described above, the price management system 102 can also utilize a variety of different machine learning models instead of, or in addition to, neural networks. For example, the price management system 102 can also utilize a regression model to generate a probability of sale for performing the acts 308a-308n.

As shown in FIG. 3, the price management system 102 can perform the acts 308a-308c by generating probabilities of sale at a plurality of prices based on an expiration date for the target product. To illustrate, the price management system 102 can perform the act 308a of generating a probability of sale at "Price 1" based on the expiration date for the target product (e.g., a dollar value for the target product that is a discounted price from an original price of the target product). Additionally, the price management system 102 can perform an act 308b of generating a probability of sale at "Price 2" In light of the expiration date for the target product. Furthermore, the price management system 102 can perform an act 308n of generating a probability of sale at "Price N" based on the expiration date for the target product including any number of probabilities for prices between "Price 2" and "Price N" (i.e., the price management system 102 generates probabilities for N prices).

Each of the probabilities corresponds to the probability that a customer or a group of customers (based on the customer data) will purchase the target product at a discrete discount price in light of the expiration date for the target product. For instance, the machine-learning model can utilize the product data to determine the plurality of discount prices for the target product to use as input. To illustrate, the price management system 102 can identify an original price of the target product from the product data and then analyze a plurality of possible discount prices based on the original price. The price management system 102 can select the possible discount prices by selecting common price points (e.g., historical prices of products in the product category), specific increments of price points lower than the original price, or other criteria for minimizing the number of possible discount prices to analyze.

After identifying the possible discount prices, the price management system 102 can use the possible discount prices as input to the machine-learning model to generate probabilities for each of the possible discount prices. In particular, the price management system 102 can use the machine-learning model to perform a separate analysis for each discount price to generate a probability of sale at the discount price. To illustrate, the price management system 102 can perform a first analysis on "Price 1" to generate a first probability of sale corresponding to "Price 1." The price management system 102 can then perform a second analysis on "Price 2" to generate a second probability of sale corresponding to "Price 2." The price management system 102 can similarly perform as many analyses as there are possible prices.

To illustrate, the machine-learning model can learn that customers with larger families who have a higher purchasing frequency of milk are more likely to be interested in purchasing a gallon of milk that is closer to expiration than customers with smaller families and lower purchasing frequency of milk. The machine-learning model can use that information, to determine a probability that a gallon of milk with a given expiration date is likely to sell at a possible discount price. Additionally, the machine-learning model can use information about demographics of the merchant (e.g., whether the merchant has a higher number of customers with large families than customers with small families) to determine the probability.

In one or more embodiments, the machine-learning model outputs probabilities for different customer demographics to allow the price management system 102 to target different groups of customers with different discount prices. For example, the price management system 102 can use the machine-learning model to output a first probability for a first customer demographic and a second probability for a second customer demographic. The price management system 102 can use the different probabilities to target the first customer demographic with a first discount price and the second customer demographic with a second discount price. Thus, the price management system 102 can target a first group of customers with a first discount price and a second group of customers with a second discount price based on purchase habits of the different groups.

In one or more embodiments, the machine-learning model outputs probabilities for different times of day or seasons based on the customer demographics that visit the merchant at those times. For instance, the price management system 102 can utilize shopping time as the customer data for training and applying a machine learning model and then generate a discount price based on the shopping time. Accordingly, the price management system can generate discount prices corresponding to daypart (e.g., morning, afternoon, evening), season, etc. In particular, the price management system 102 can generate different discount prices for the different groups based on daypart. Thus, the price management system 102 can flexibly change the discount price for a target product based on the time of day or time of year according to the customers that purchase product from the merchant during different times and that purchase products in the product category with certain shelf lives.

The price management system 102 can also generate, with each probability, a predicted loss to the merchant for the discount price. The loss can be based on an original cost of the target product to the merchant and the price sold. As mentioned previously, because a target product can include a plurality of product units with the same expiration date, the loss can also take into account the number of product units sold. Accordingly, in one or more embodiments, a simplified loss function for products already sold can be represented as:

$$L = C_f - NT_s,$$

where $C_I$ represents the total cost for products in inventory, N represents the number of products sold, and $T_s$ represents the price at which the products sold. For future products (or unsold products), the above equation can be rewritten as:

$$L=(C_uI)-(P_SI)(T_iD),$$

where L represents the overall loss, I represents the number of product items of the target product in inventory, $C_u$ represents the cost per product unit, $T_i$ represents an original price for the target product, D represents a discount price as a percentage of $T_i$, and $P_S$ represents the probability of sale at $T_iD$. This equation can further be simplified to:

$$L=I(C_u-P_ST_iD).$$

By generating a plurality of probabilities for a plurality of possible discount prices, the price management system 102 can create a set of probabilities and corresponding loss values. Additionally, while the above equations represent loss for a plurality of products in an inventory, the price management system 102 can also calculate loss for each individual target product. To illustrate, the loss for a single product may be represented as:

$$L=C_u-P_ST_iD.$$

As shown in FIG. 3, the price management system also performs the act 310 of determining a discount price for the target product. Specifically, the price management system 102 can use the probabilities and loss values to determine a discount price for the target product. The price management system 102 can thus attempt to minimize actual losses incurred by the merchant for listing the target product at discount price according to the probability of selling the target product at the discount price.

To illustrate, for a target product that a merchant purchased (i.e., "cost") 10 units at $50 per unit (for a total cost of $500) and originally listed at $100 per unit, the price management system 102 can utilize the machine-learning model to generate a plurality of possibilities for a plurality of possible discount prices. The price management system 102 can also predict losses associated with the possible discount prices based on the probabilities. The discount prices (as a percentage of the original listing price), example probabilities based on the discount prices, and predicted loss are shown in Table 1 below:

| Discount Price (% of Original) | Probability of Sale | Loss |
| --- | --- | --- |
| 100% | 5% | $450 |
| 90% | 30% | $230 |
| 80% | 35% | $220 |
| 70% | 35% | $255 |
| 60% | 50% | $200 |
| 50% | 50% | $250 |
| 40% | 60% | $260 |
| 30% | 80% | $260 |
| 20% | 80% | $340 |
| 10% | 80% | $420 |
| 0% | 100% | $500 |

As shown in Table 1, the price management system 102 can determine a probability for each possible discount price. As one can appreciate, while Table 1 illustrates a plurality of probabilities, the probabilities shown are merely examples and can be different values according to product data, customer data, and training of the machine-learning model. The price management system 102 can then use the probability for each discount price to determine a loss that is based on the cost, probability, and discount price. Based on the losses for the discount prices, the price management system 102 can select a discount price for the target product that minimizes the loss to the merchant (e.g., a discount price of 60% in Table 1 with a loss of $200).

While FIG. 3 generally describes generating a discount price to provide to a customer, the price management system 102 can utilize the machine-learning model to provide different discount prices for different customers or to determine the best price to provide to one or more customers from a plurality of discount prices. For example, the price management system 102 can utilize the machine-learning model to generate a plurality of probabilities for a single target product at a price for a plurality of different customers. The output of the machine-learning model can thus include a first probability that a first customer will purchase a target product at a first price, a second probability that a second customer will purchase the target product at the first price, etc. The price management system 102 can then compare the probabilities for the target product at the first price, second price, etc. The price management system 102 can then provide the discount price to a customer based on the comparison (e.g., to the customer with the highest probability).

In one or more embodiments, the price management system 102 generates probability for various customers and various prices. For example, the price management system 102 can generate a first probability for a first customer at a first price, a second probability for a second customer at a second price, a third probability for the first customer at the second price, and a fourth probability for the second customer at the first price. The price management system 102 can compare the probabilities (e.g., identify the highest probability) and provide corresponding price to the corresponding customer (e.g., the second customer at the first price if the fourth probability was the highest).

In another example, the price management system 102 can use the machine-learning model to determine a discount price for a target product based on comparing determined discount prices corresponding to a plurality of customers. In particular, the price management system 102 can determine a discount price for each of a plurality of customers (or groups of customers). The price management system 102 can then compare the discount prices for the plurality of customers (or groups) and then select the highest discount price. The price management system 102 can then provide the highest discount price to the corresponding customer (or group of customers). The price management system 102 may also take into account the probabilities associated with the discount prices to select the highest discount price if the associated probability meets a threshold; otherwise, the price management system 102 can select a lower discount price with an associated probability that meets the threshold.

Figure 4:
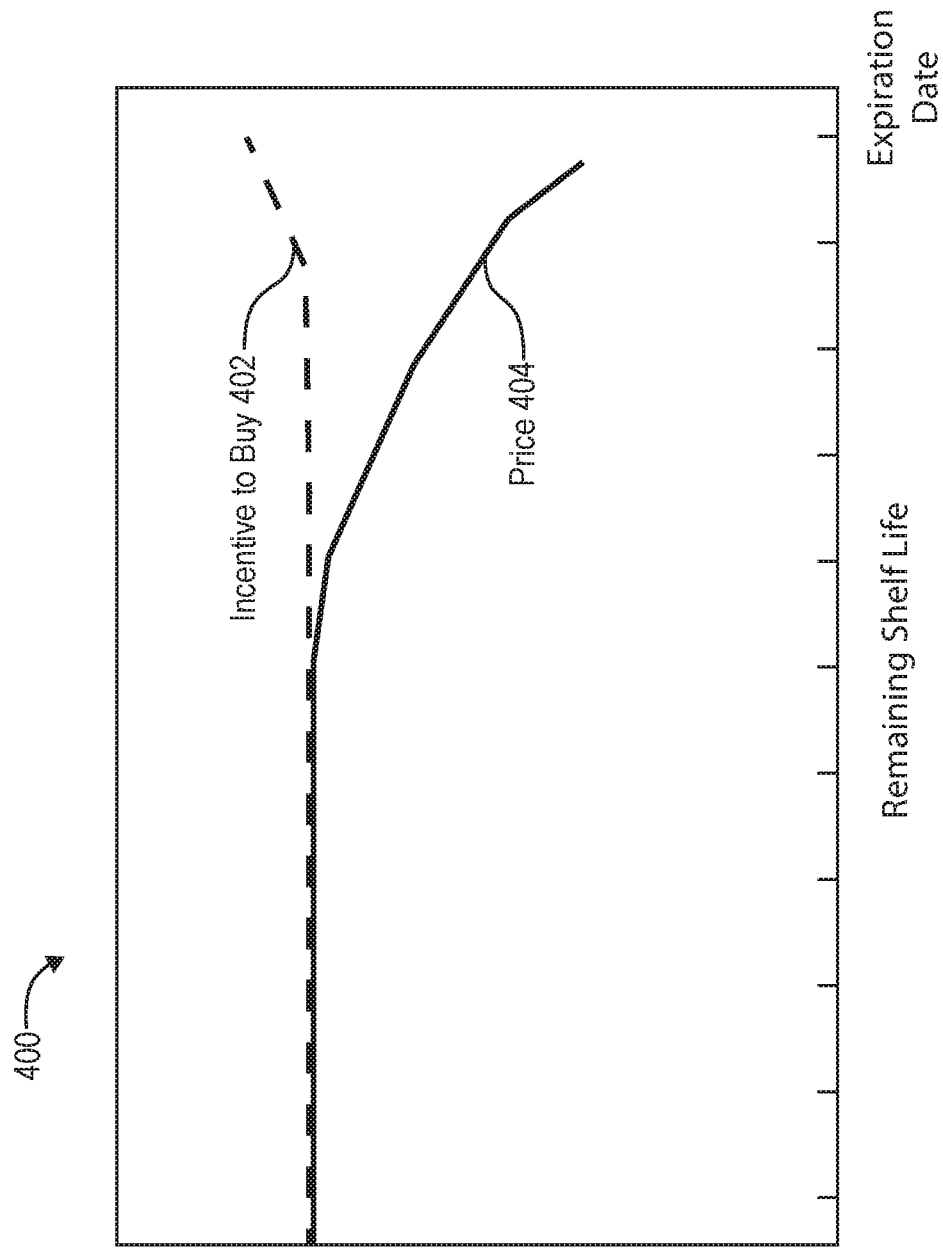
FIG. 4 illustrates a graph diagram of a correlation between product price and incentive to buy relative to a remaining shelf life of the product in accordance with one or more embodiments.

As described in relation to FIG. 3, the price management system 102 can thus determine a discount price for a target product that will reduce loss in light of an upcoming expiration date. Accordingly, the acts and algorithms illustrated and described above in relation to FIG. 3 can provide the corresponding structure for an example step 300 for utilizing a machine-learning model trained using product history data of a plurality of products available for purchase from the merchant to determine a discount price for the target product based on the expiration date of the target product As previously mentioned, the price management system 102 can generate one or more discount prices for a target product. In one or more embodiments, the price management system 102 generates a pricing model for the target product based on the expiration date of the target product. For example, FIG. 4 illustrates a graph diagram of a pricing model 400 for a target product, indicating a correlation between the change in price (indicated by the dashed line 402) of the target product over time and the incentive to buy (indicated by the solid line 404). As illustrated, by changing a discount price of the target product over time, the price management system 102 can maintain, or even increase, a customer's incentive to purchase the product. In particular, by utilizing a machine-learning model trained on historical information for products and customers, the price management system 102 can determine pricing models that change the price to fit the customers' desire to purchase the target product according to the purchase habits of the customers.

To generate a pricing model for a target product, the price management system 102 can use the machine-learning model to output a plurality of discount prices that minimize the loss for the target product over time (i.e., as the remaining shelf life of the target product changes). Thus, the machine-learning model can output a plurality of probabilities for possible discount prices for a plurality of different times. For example, the machine-learning model can output probabilities for possible discount prices within a first time window, probabilities for possible discount prices within a second time window, etc. The price management system 102 can then determine a discount price (and/or customer) for each time window based on the corresponding probabilities. By generating a pricing model for the target product, the price management system 102 can quickly and easily change the discount price of the target product over time. To illustrate, the price management system 102 can determine a remaining shelf life of the target product and then select the discount price for the remaining shelf life from the pricing model without re-analyzing the product data and customer data each time the price management system 102 provides a discount price to the customer(s).

In one or more embodiments, the price management system 102 can update a pricing model for a target product in response to receiving additional product data or customer data. For instance, if a customer's purchase habits change during the duration of the pricing model (e.g., prior to the expiration date of the target product), the price management system 102 can input the new customer data into the machine-learning model to update the probabilities and select new discount price(s), if applicable. Similarly, if the product data changes (e.g., available inventory, trends related to the product category or similar product categories), the price management system 102 can use the new product data to update the probabilities and discount price (s).

While the above embodiments describe the price management system 102 generating a pricing model that includes a plurality of discount prices over time, the price management system 102 can alternatively use the machine-learning model to dynamically generate a single discount price for a target product. Specifically, instead of generating a plurality of discount prices over time for the target product, the price management system 102 can generate only a single discount price that is currently relevant to a customer. This may be particularly useful for products with historically volatile pricing or purchasing trends. Thus, the price management system 102 can flexibly generate discount prices based on the products, customers, and/or available processing capabilities.

Figure 5B:
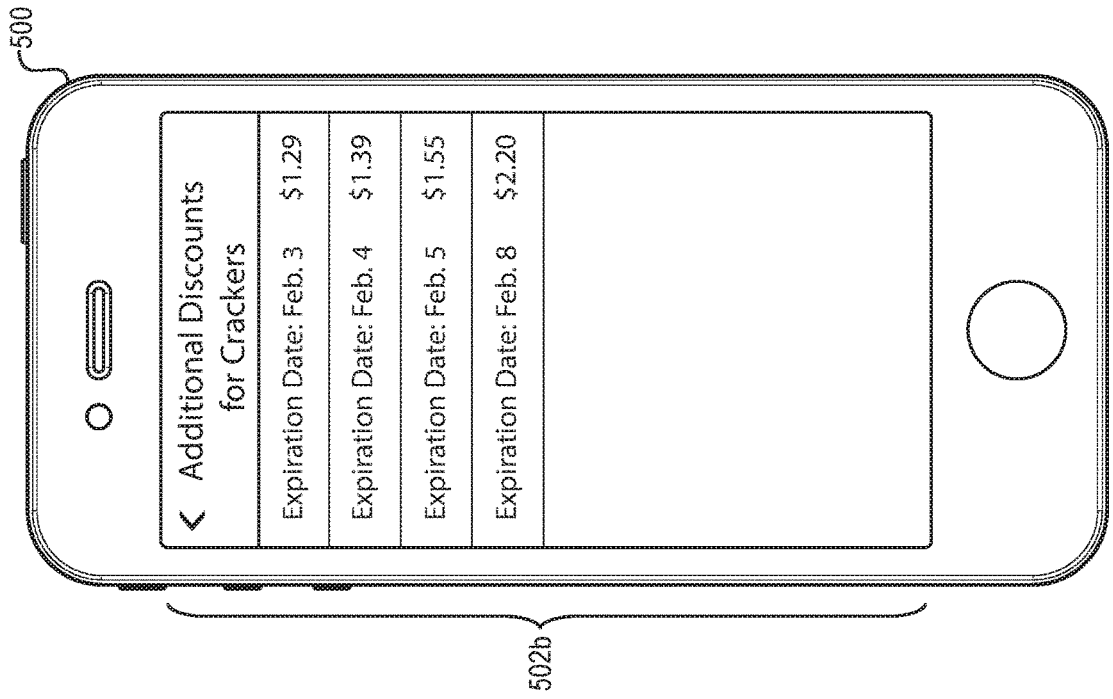
FIGS. 5A-5C illustrate user interfaces for providing dynamic discount prices for a product to a customer within a mobile application in accordance with one or more embodiments.
Figure 5A:
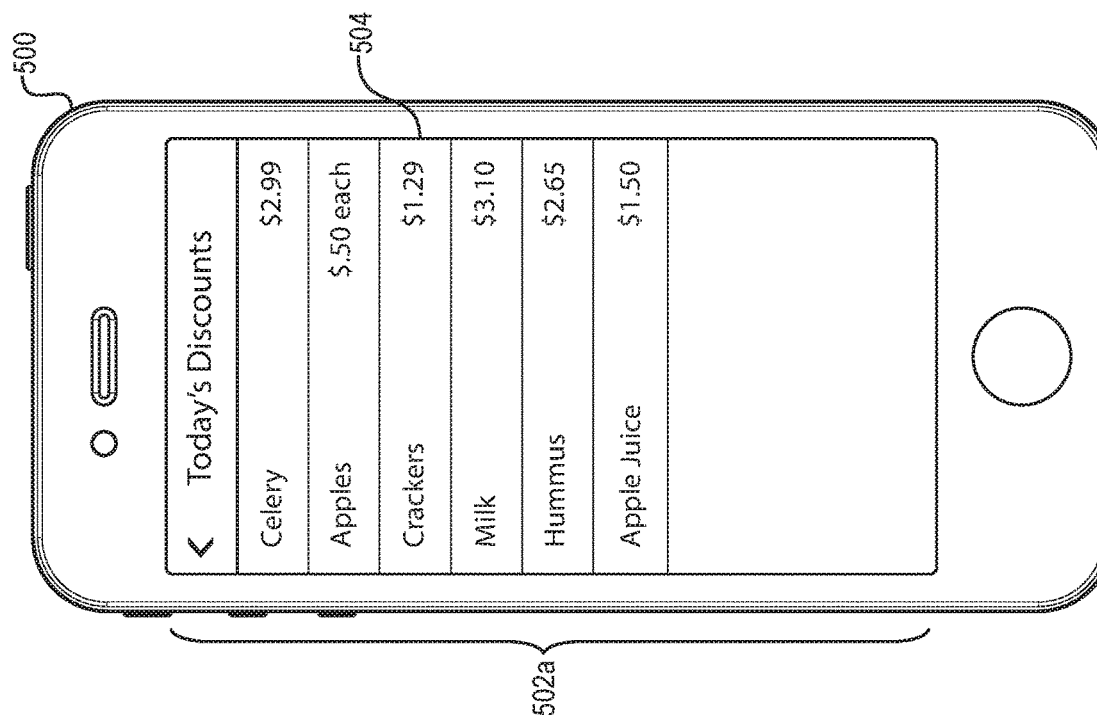
Figure 5C:
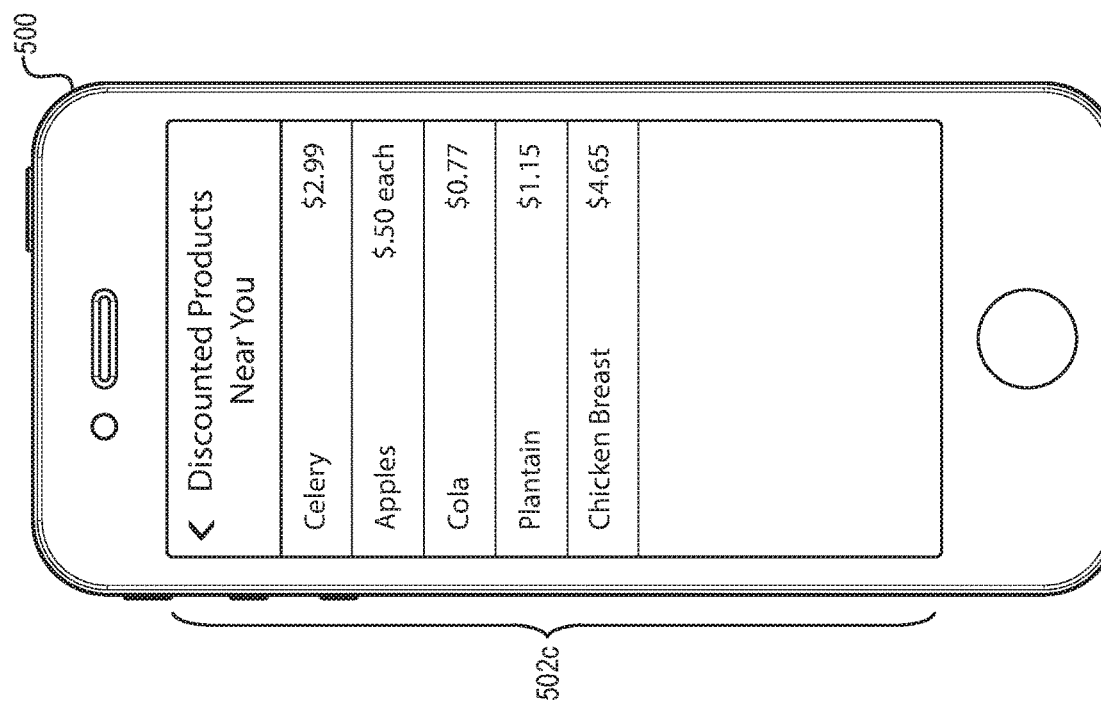
Figure 6:
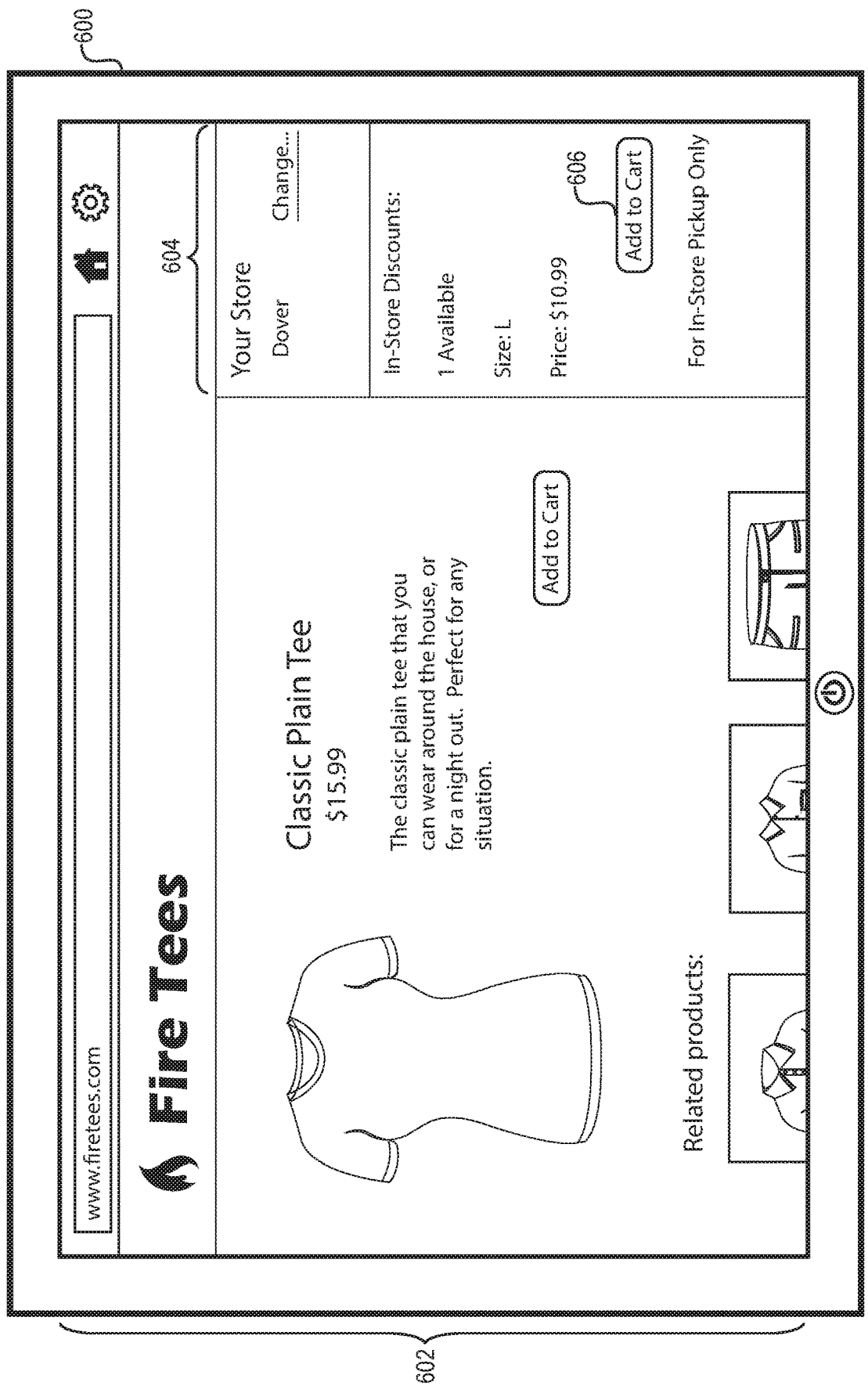
FIG. 6 illustrates a user interface for providing dynamic discount prices for a product to a customer within a desktop application in accordance with one or more embodiments.

As mentioned previously, after the price management system 102 has generated a discount price for the target product, the price management system 102 can provide the discount price to a client device of a customer. FIGS. 5A-5C and FIG. 6 illustrate embodiments of user interfaces of customer client devices by which customers can receive indications of discount prices for one or more target products. In particular, FIGS. 5A-5C illustrate a customer client device including a mobile computing device. FIG. 6A illustrates a customer client device including a desktop computing device.

FIG. 5A illustrates an embodiment of a customer client device 500 that includes discount interface 502a by which a customer receives one or more discount prices for one or more products available for purchase from a merchant based on expiration date of the products. Specifically, the discount interface 502a can be part of a client application that operates on the customer client device 500. The client application can be a web browser or merchant-specific application that allows the customer to view products available for purchase from the merchant. Furthermore, as described in more detail below, the client application can allow the customer to view discount prices of one or more products, the discount prices being based on expiration dates of the corresponding products.

The client application can include functionality that displays the discount interface 502a to the customer in response to the customer selecting an option to view discount prices. For example, the customer can use the client application to navigate to the discount interface 502a to view discount prices for one or more products that have upcoming expiration dates. As illustrated, the discount interface 502a can present a plurality of discount prices for products in which the customer is possibly interested.

As mentioned previously, the price management system 102 can determine that the customer is potentially interested in a target product based on information that the customer client device 500 provides to the price management system 102. For instance, the price management system 102 can detect the customer interest based on location data from the customer client device 500 indicating that the customer is near a store location of the merchant. Additionally, the price management system 102 can use customer data for the customer to determine products that the customer has purchased in the past, including purchase frequency and recency. Alternatively, the price management system 102 can detect customer interest based on the customer viewing a product interface including information about the target product.

In one or more embodiments, the price management system 102 determines an interest score of the customer for a plurality of products and then ranks the products based on the interest score. In particular, the price management system 102 can determine the interest score of the customer for a product based on the customer data and/or location of the customer client device 500 relative to a location of the products within a store of the merchant. For example, if the customer frequently purchases milk from the merchant, the price management system 102 can determine that the customer has a high interest score for milk. In another example, and as described in more detail with respect to FIG. 5C, if the customer frequently visits a particular section of the store (e.g., a dairy section), the price management system 102 can determine that the customer is more likely to be interested in products located in that section of the store, even if the customer has not purchased certain products in that section previously.

The price management system 102 can then rank the products based on the corresponding levels of interest to determine which discount prices to present to the customer within the display interface 502a. For example, as illustrated in FIG. 5A, the discount interface 502a includes a plurality of products available for purchase from the merchant. The price management system 102 can select the discount prices to display to the customer in response to determining that the customer is likely to be interested in the target products. The price management system 102 can thus determine which products, and in which order, to present within the discount interface 502a based on the customer's interest score.

For each product, the price management system 102 can also select the target product that the customer is most likely to purchase if there are a plurality of products with different expiration dates in the same product category. To illustrate, for a customer that is more likely to purchase a product that is very near the expiration date due to a low discount price, the price management system 102 can select a target product with a nearing expiration date. Similarly, for a customer that is less likely to purchase a product very near the expiration date, even with a discounted price, the price management system 102 can select a target product within the same product category with an expiration date that is further away.

Additionally, the price management system 102 can provide discount prices to a customer based on a distance of the customer from a store location of the corresponding target products. For instance, if a customer is at or near the store location of a target product that is expiring soon (e.g., on a current day), the price management system 102 can provide a notification of the discount price of the target product to the customer. However, if the customer is not near the store location (e.g., the customer is at home), the price management system 102 may make a determination not to provide the discount price of the target product to the customer. Specifically, a customer that is not near the store location may not be likely to purchase a target product that is expiring that day if the customer is far away from the store location. Instead, the price management system 102 may provide a notification to the customer of another target product, from the same product category, that has a later expiration date. In other words, as distance from a store location increases, the price management system 102 can generate discount price recommendations for products that have a greater amount of remaining shelf life.

In one or more embodiments, the customer can view additional target products within a product category by selecting a product from the discount interface 502a. For example, if the customer selects a product element 504 within the discount interface 502a, the client application can display a discount interface 502b that includes a plurality of target products within a single product category, as illustrated in FIG. 5B. To illustrate, if the customer selects the product element 504 corresponding to "Crackers," the discount interface 502b presents a plurality of target products in the "Crackers" product category with additional discount prices based on the expiration dates.

The discount interface 502b can also display information about the expiration dates of the target products so that the customer can be informed about the expiration dates relative to the discount prices. As illustrated, the discount prices are lower for target products that are nearer to their expiration dates than for target products that are further away from their expiration dates. In one or more embodiments, selecting a corresponding product element within the discount interface 502b causes the client application to display more information associated with each target product (e.g., location in the store, number available).

In one or more embodiments, the price management system 102 causes the client application to provide discount information to the customer in response to determining that the customer is near a specific location. For example, as mentioned, the price management system 102 can determine a location of the customer relative to a plurality of products within a store. In particular, the price management system 102 can use precise location data from the customer client device 500 (e.g., via Bluetooth location detection, cameras, wireless sensors, beacons, IoT devices, or other sensors that allow the price management system 102 to track the location of the customer within the store via the customer client device 500 or a smart cart) to identify products that are within a geo-fence of the customer.

The price management system 102 can then determine whether any of the products have discount prices available for the customer and present the discount prices within a discount interface 502c, as illustrated in FIG. 5C. In addition to determining whether any of the products have discount prices available, the price management system 102 can also determine whether the customer is likely to be interested in any of the products. For instance, the price management system 120 can use detected levels of interest, as previously described, to determine which, if any, discount prices to present to the customer. To illustrate, the price management system 102 can compare the levels of interest to a threshold, and then select a discount price for display if the corresponding interest score meets the threshold. The price management system 102 can also limit the number of products to display to a specific number of discount prices and display the products according to the ranking.

The price management system 102 can provide discount price information via a variety of different notifications. For example, in addition to notifications illustrated in FIGS. 5A-5C, 6, the price management system 102 can utilize device notifications (e.g., within a notification portion of an operating system interface). Specifically, rather than requiring a customer to have a client application open (e.g., active) on the customer client device, the price management system 102 can instead provide discount prices to the customer via a separate notification (e.g., pop-up notification in a separate user interface). For instance, in response to detecting the customer interest in a target product, the price management system 102 can cause the client application to provide a notification to the customer of one or more discount prices for the target product (e.g., as part of a banner pop-up). Additionally, the price management system 102 can push a notification to a customer client device in response to determining that a target product is expiring soon (e.g., that day or the next day) if a user is at an in-store location of the target product.

In one or more embodiments, the price management system 102 provides notifications to a customer indicating that a target product with a better discount price is available than a target product that the customer has selected. In particular, the price management system 102 can determine that a customer has selected a target product by collecting product data from a device such as a smart cart, checkout scanner, IoT sensor, or other device. For example, the price management system 102 can use a device to detect that a customer has placed the target product in a smart cart, or that the customer is at a checkout location (e.g., a self-checkout location) with the target product by utilizing a checkout scanner or IoT sensor. The price management system 102 can then make a determination that another target product within the same product category has a lower discount price (e.g., a target product with a nearer expiration date) and provide a notification to the customer of the other target product. The price management system 102 can then allow the customer to select the best target product to meet the customer's desires based on the expiration date(s) and discount price(s).

Additionally, while FIGS. 5A-5C illustrate embodiments in which the price management system 102 provides discount prices in response to detecting a location of a mobile computing device at a store location, the price management system 102 can also provide discount prices to a customer remotely accessing a website (or web application) associated with the merchant. FIG. 6 illustrates a customer client device 600 that includes a desktop computing device that includes a product interface 602 by which a customer views details associated with a product.

In one or more embodiments, the product interface 602 includes a plurality of details associated with a target product available for purchase from a merchant. The product interface 602 may also allow the customer to add the target product to a virtual shopping cart for purchasing from a distribution center that fulfills online product purchases. Accordingly, the merchant may be an online distributor that sells and ships products to customers from a plurality of different locations. As mentioned, the price management system 102 can dynamically generate discount prices for non-perishable products, such as the target product illustrated in FIG. 6 (i.e., a t-shirt).

Additionally, the price management system 102 can apply the discount prices to target products available for purchase and shipping online or to target products that are in stock at physical store locations associated with the merchant. For example, the price management system 102 can use location information or preference information to determine a store location associated with the customer. To illustrate, the customer may be near a store located in "Dover," and the price management system 102 can detect the customer location (e.g., based on IP address or user profile information) and select the "Dover" store as the customer's preferred store location. The price management system 102 can then access inventory information associated with the "Dover" store to determine whether the store location includes any units of the target product in stock.

In response to determining whether the customer's preferred store location has the target product in stock, the price management system 102 can identify or determine any discount prices for the target product, if applicable, based on the expiration date of the target product. In particular, if the target product has an expiration date that is near, the merchant may wish to sell the product at a discounted price to maintain consistent inflow and outflow of product inventory. In one or more embodiments, the price management system 102 can select a previously generated discount price or generate a discount price at the time the customer views the product interface 602.

The price management system 102 can then provide the discount price to the customer client device 600. For instance, the product interface 602 can include a discount section 604 that includes information about one or more target products with discount prices at the customer's preferred store location. To illustrate, in response to determining that the preferred store location has one unit of the target product in stock at a discount price, the price management system 102 can present the discount price and product information (e.g., size, availability) within the discount section 604. In various embodiments, the discount section may be a portion of the product interface 602, an overlay, an alert or notification, or other visual indicator that includes the product information and/or the discount price for the target product.

In one or more embodiments, the discount section 604 can also include an option 606 to add the target product at the preferred store location to a shopping cart. In particular, the shopping cart in the discount section 604 applies only to the target product with the discount price at the preferred store location. Thus, adding the target product to the shopping cart and purchasing the target product can cause the merchant to reserve the target product for the customer at the preferred store location. Additionally, the price management system 102 may limit the customer to in-store pickup of the target product or shipping a specific unit of target product from the preferred store location to ensure that the target product with a specific expiration date is provided to the customer.

While the above embodiments describe using certain criteria for selecting and displaying discount prices to a customer with respect to specific embodiments of user interfaces, the price management system 102 can use any combination of the criteria for any one or more of the interfaces described above. For instance, the price management system 102 can combine the functionalities described with reference to separate user interfaces into a single user interface. Additionally, the price management system 102 can also implement such functionality for a plurality of customers across a plurality of customer client devices (e.g., by applying the machine-learning model to a plurality of customers individually or collectively) to provide discount prices to a plurality of customers. Moreover, the price management system 102 can also use location information from a customer client device to dynamically generate one or more discount prices prior to displaying the discount prices in the user interfaces. Thus, the price management system 102 can generate the discount prices beforehand or in real-time, which gives the price management system 102 flexibility to provide discount prices to groups of customers or to individual customers.

Additionally, although the above embodiments describe providing discount prices to customer client devices, the price management system 102 can also provide discount prices to customers via other methods. In particular, the price management system 102 can implement dynamic price tags that provide dynamic discount prices at in-store locations. For example, in response to generating or updating a discount price for a target product, the price management system 102 can display the generated/updated discount price on the dynamic price tag. A dynamic price tag may include a digital price tag in communication with the price management system 102 (e.g., directly or via a merchant system). Additionally, the price management system 102 can utilize a device at checkout (e.g., a checkout computing device with a display screen) to notify the customer of a discount price for the target product. This allows the price management system 102 to quickly update discount prices for target products without requiring customers to use a client device to view the discount prices.

Figure 7:
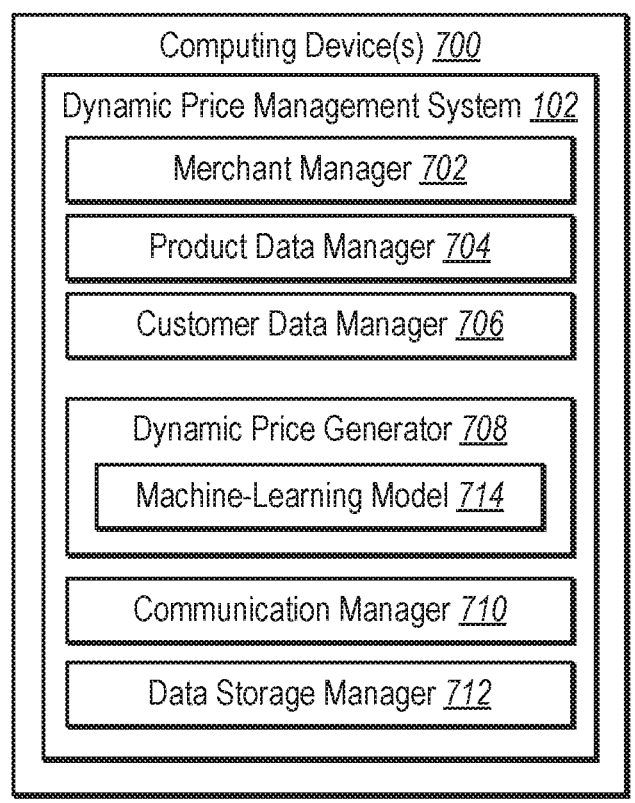
FIG. 7 illustrates a schematic diagram of the dynamic price management system of FIG. 1 in accordance with one or more embodiments.

FIG. 7 illustrates a detailed schematic diagram of an embodiment of the price management system 102 of FIG. 1. As shown, the price management system can be part of computing device(s) 700. Additionally, the price management system 102 can include, but is not limited to, a merchant manager 702, a product data manager 704, a customer data manager 706, a dynamic price generator 708, communication manager 710, and a data storage manager 712. The price management system 102 can be implemented on any number of computing devices (e.g., the server device(s) 110, the customer client device 104a, and/or the merchant device 108 of FIG. 1). For example, the price management system 102 can be implemented in a distributed system of server devices for generating dynamic discount prices for a plurality of products in a product inventory associated with a merchant. Alternatively, the price management system 102 can be implemented on a single computing device such as the merchant device 108 of FIG. 1.

In one or more embodiments, each of the components of the price management system 102 are in communication with one another using any suitable communication technologies. Additionally, the components of the price management system 102 can be in communication with one or more other devices including the customer client devices 104a, 104b and the merchant device 116, as illustrated in FIG. 1. It will be recognized that although the components of the price management system 102 are shown to be separate in FIG. 7, any of the subcomponents may be combined into fewer components, such as into a single component, or divided into more components as may serve a particular implementation. Furthermore, although the components of FIG. 7 are described in connection with the price management system 102, at least some of the components for performing operations in conjunction with the price management system 102 described herein may be implemented on other devices within the environment.

The components of the price management system 102 can include software, hardware, or both. For example, the components of the price management system 102 can include one or more instructions stored on a computer-readable storage medium and executable by processors of one or more computing devices (e.g., the computing device(s) 700). When executed by the one or more processors, the computer-executable instructions of the price management system 102 can cause the computing device(s) 700 to perform the dynamic price management methods described herein. Alternatively, the components of the price management system 102 can comprise hardware, such as a special purpose processing device to perform a certain function or group of functions. Additionally or alternatively, the components of the price management system 102 can include a combination of computer-executable instructions and hardware.

Furthermore, the components of the price management system 102 performing the functions described herein with respect to the price management system 102 may, for example, be implemented as part of a stand-alone application, as a module of an application, as a plug-in for applications including content management applications, as a library function or functions that may be called by other applications, and/or as a cloud-computing model. Thus, the components of the price management system 102 may be implemented as part of a stand-alone application on a personal computing device or a mobile device. Alternatively or additionally, the components of the price management system 102 may be implemented in any application that allows product and customer management, including, but not limited to, applications in ADOBE® ANALYTICS CLOUD, such as ADOBE® ANALYTICS, ADOBE® AUDIENCE MANAGER, ADOBE® CAMPAIGN, ADOBE® EXPERIENCE MANAGER, and ADOBE® TARGET. "ADOBE", "ADOBE ANALYTICS CLOUD", "ADOBE ANALYTICS", "ADOBE AUDIENCE MANAGER", "ADOBE CAMPAIGN", "ADOBE EXPERIENCE MANAGER", and "ADOBE TARGET" are registered trademarks of Adobe Systems Incorporated in the United States and/or other countries.

As mentioned, the price management system 102 can include a merchant manager 702 to facilitate the management of merchants associated with the price management system 102. Specifically, the merchant manager 702 can perform price management and dynamic price generation for one or more merchants. For example, the merchant manager 702 can track inventory inflow and outflow for a merchant and obtain product data for each of the products within one or more product inventories for the merchant. Additionally, the merchant manager 702 can manage store information for a merchant including locations of merchant stores.

The price management system 102 can include a product data manager 704 that manages product data for products in one or more product inventories of a merchant. As described previously, the product data can include various details about products including expiration dates of the products, serial numbers, UPC codes, SKUs, product categories, product descriptions, product characteristics (e.g., calories, health foods, or brands), etc. Thus, the product data manager 704 can determine and/or otherwise obtain product data for products to allow the price management system 102 to distinguish each product unit from other product units. The product data manager 704 can also track locations of products at specific stores and/or in distribution facilities or warehouses. Furthermore, the product data manager 704 also manages product history data for products, including purchase histories of the products.

The price management system 102 also includes a customer data manager 706 to manage customer data and customer history data for a plurality of customers associated with a merchant. In particular, the customer data manager 706 can manage customer profiles and/or customer demographic profiles for the plurality of customers of the merchant. The customer data manager 706 can collect information about customers including purchase habits, customer demographics information, family information, or other information that can be indicative of a customer's interests in various products offered by the merchant. In one or more embodiments, the customer data manager 706 accesses at least some of the customer data or customer history data from a customer profile database associated with a merchant (e.g., from a corresponding merchant system). In one or more embodiments, the customer data manager 706 collects at least some of the customer data or customer history data directly from customers (e.g., from customer client devices).

The price management system 102 includes a dynamic price generator 708 that uses data from the merchant manager 702, product data manager 704, and customer data manager 706 to dynamically generate discount prices for target products. Specifically, the dynamic price generator 708 can include a machine-learning model 714 (e.g., neural network or regression model) for generating discount prices for one or more products to provide to one or more customers. The dynamic price generator 708 can train the machine-learning model 714 using product history data and customer history data. The dynamic price generator 708 can apply the trained machine-learning model 714 to product data of a target product and customer data of one or more customers to output probabilities of sale at a plurality of possible discount prices based on expiration data of a target product. The dynamic price generator 708 can then generate a discount price for the target product based on the output of the machine-learning model 714 utilizing the expiration data.

In addition, the price management system 102 includes a communication manager 710 that facilitates communication with merchant systems and customer client devices. In particular, the communication manager 712 can obtain product data and/or customer data from merchant systems associated with merchants identified by the merchant manager 702. The communication manager 712 can also use information from the dynamic price generator 708 to provide notifications comprising discount prices to one or more customers via customer client device(s) of the customer(s) or to devices at merchant store locations for presenting to the customers. Thus, the communication manager 712 can dynamically provide timely discount price information to customers for target products based on the expiration dates of the target products.

The price management system 102 also includes a data storage manager 712 (that comprises a non-transitory computer memory) that stores and maintains data associated with product inventory and price management. For example, the data storage manager 712 can include a database that stores product data for a plurality of products of a merchant, including expiration data for the plurality of products. Additionally, the data storage manager 712 can store information associated with customers, such as customer profiles and customer purchase information in connection with the plurality of products of the merchant. Furthermore, the data storage manager 712 can store one or more machine-learning models 712 or regression models 714 for use in generating dynamic discount prices for products based on expiration data.

Figure 8:
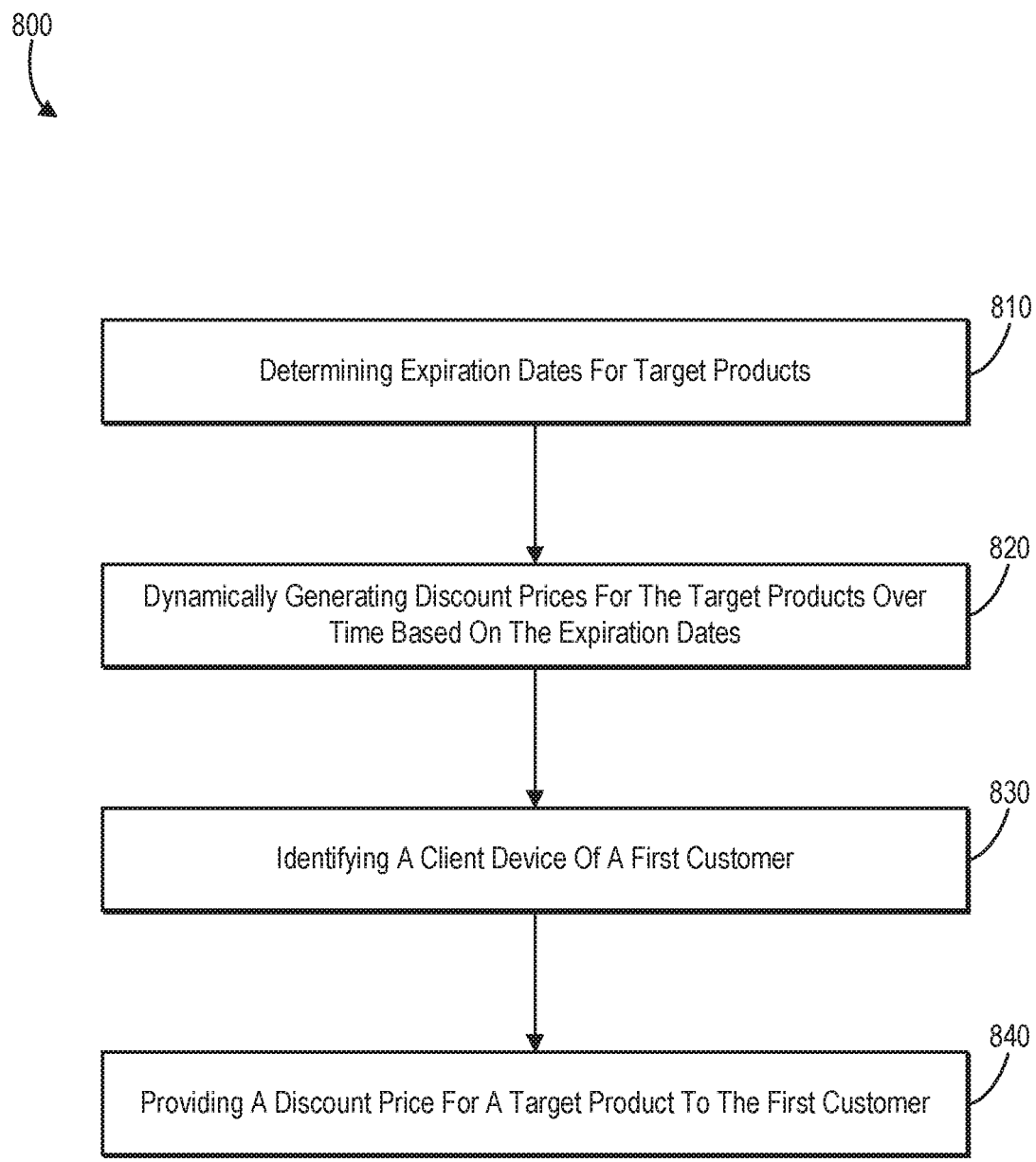
FIG. 8 illustrates a flowchart of a series of acts in a method of dynamically generating discounted product digital notifications based on remaining product shelf life in accordance with one or more embodiments.

Turning now to FIG. 8, this figure illustrates a flowchart of a series of acts 800 of dynamically generating discounted product digital notifications based on remaining product shelf life. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8.

The series of acts 800 includes an act 810 of determining expiration dates for target products. For example, act 810 involves determining expiration dates for a plurality of target products from a plurality of product categories available for purchase from a merchant. Act 810 can involve accessing a database comprising a plurality of predetermined expiration dates for the plurality of target products to determine the expiration dates. Alternatively, act 810 can involve utilizing a sensor to analyze the plurality of target products in real-time to determine the expiration dates. For example, the sensor can comprise a camera sensor, a smell detector, or a UV sensor.

The series of acts 800 also includes an act 820 of dynamically generating discount prices for the target products over time based on the expiration dates. For example, act 820 involves dynamically generating discount prices for the plurality of target products over time based on the expiration dates of the plurality of target products, the discount prices comprising a first discount price for a first target product based on a first expiration date. Additionally, the discount prices can also include a second discount price for the first target product based on the first expiration date. For example, act 820 can involve determining the first discount price for a first time window and the second discount price for a second time window.

For instance, act 820 can involve generating, using a machine-learning model trained using the product history data and the customer history data, the discount prices for the plurality of target products over time by providing as input to the machine learning model: product data of the first target product and customer data of the first customer, the product data comprising the expiration date of the first target product. The customer data can include a purchase frequency, a purchase recency, and a consumption rate in connection with a product category comprising the target product for the first customer, demographic information for the first customer, or a price sensitivity for the first customer.

Act 820 can involve generating, based on the expiration dates of the plurality of target products, probabilities of sale for the plurality of target products at a plurality of discount prices. Act 820 can then involve dynamically generating, based on the generated probabilities, the discount prices for the plurality of target products.

Act 820 can involve determining a possible discount price for a target product of the plurality of target products. Act 820 can then involve generating, based on product history data of the target product and customer history data of a plurality of customers associated with the merchant, a probability of sale for the target product of the plurality of target products at the possible discount price.

Act 820 can involve dynamically generating the discount prices for the plurality of target products based on product history data of a plurality of products from the plurality of product categories and customer history data of a plurality of customers associated with the merchant, the product history data comprising the expiration dates of the plurality of target products. To illustrate, the product history data can include a purchase history and a price history of the plurality of product categories. For example, act 820 can involve dynamically generating the discount prices using a neural network trained using the product history data and the customer history data. Furthermore, act 820 can involve providing customer history data for the first customer as input to the neural network.

Act 820 can involve dynamically generating a first plurality of discount prices for a first plurality of target products of a first product category at a first store associated with the merchant. Act 820 can also involve dynamically generating a second plurality of discount prices for a second plurality of target products of the first product category at a second store associated with the merchant, the second plurality of discount prices being different than the first plurality of discount prices.

The series of acts 800 further includes an act 830 of identifying a client device of a first customer. For example, act 830 involves identifying a client device of a first customer associated with the merchant. Act 830 can involve determining that a location of the client device of the first customer is within a geo-fence of a location of the merchant. For example, act 830 can involve determining the location of the client device first customer relative to the location of the merchant. Act 830 can further involve determining a location of the client device of the first customer within a store location of the merchant using a location detection device at the store location. Additionally, act 830 can involve determining a location of the client device of the first customer relative to one or more target products of the plurality of target products at the store location.

Act 830 can also involve identifying a client device of a second customer associated with the merchant. For example, act 830 can involve determining that a location of the client device of the second customer is within the geo-fence of the location of the merchant.

Additionally, the series of acts 800 includes an act 840 of providing a discount price for a target product to the first customer. For example, act 840 involves providing, to the client device of the first customer, the first discount price for the first target product. Act 830 can involve providing, to the client device of the first customer, the first discount price by providing the first discount price within a mobile application associated with the merchant. Additionally, act 830 can involve providing the first discount price within a notification of an operating system notification area of the client device of the first customer. Act 840 can also involve providing, to the client device of the second customer, the second discount prices for the first target product.

Act 840 can also involve determining a subset of the discount prices for the plurality of target products to provide to the client device of the first customer. For example, act 840 can involve generating rankings of the discount prices and selecting the subset of the discount prices based on rankings of the discount prices. Generating rankings of the discount prices can involve generating interest scores for the plurality of target products and generating the rankings of the discount prices based on the generated interests scores for the plurality of target products.

The series of acts 800 can further include generating a first probability of the first customer purchasing the first target product at the first discount price and generating a second probability of the second customer purchasing the first target product at the first discount price. The series of acts 800 can then include comparing the first probability to the second probability, and, in response to determining that the first probability is greater than the second probability, providing, to the client device of the first customer, the first discount price for the target product.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
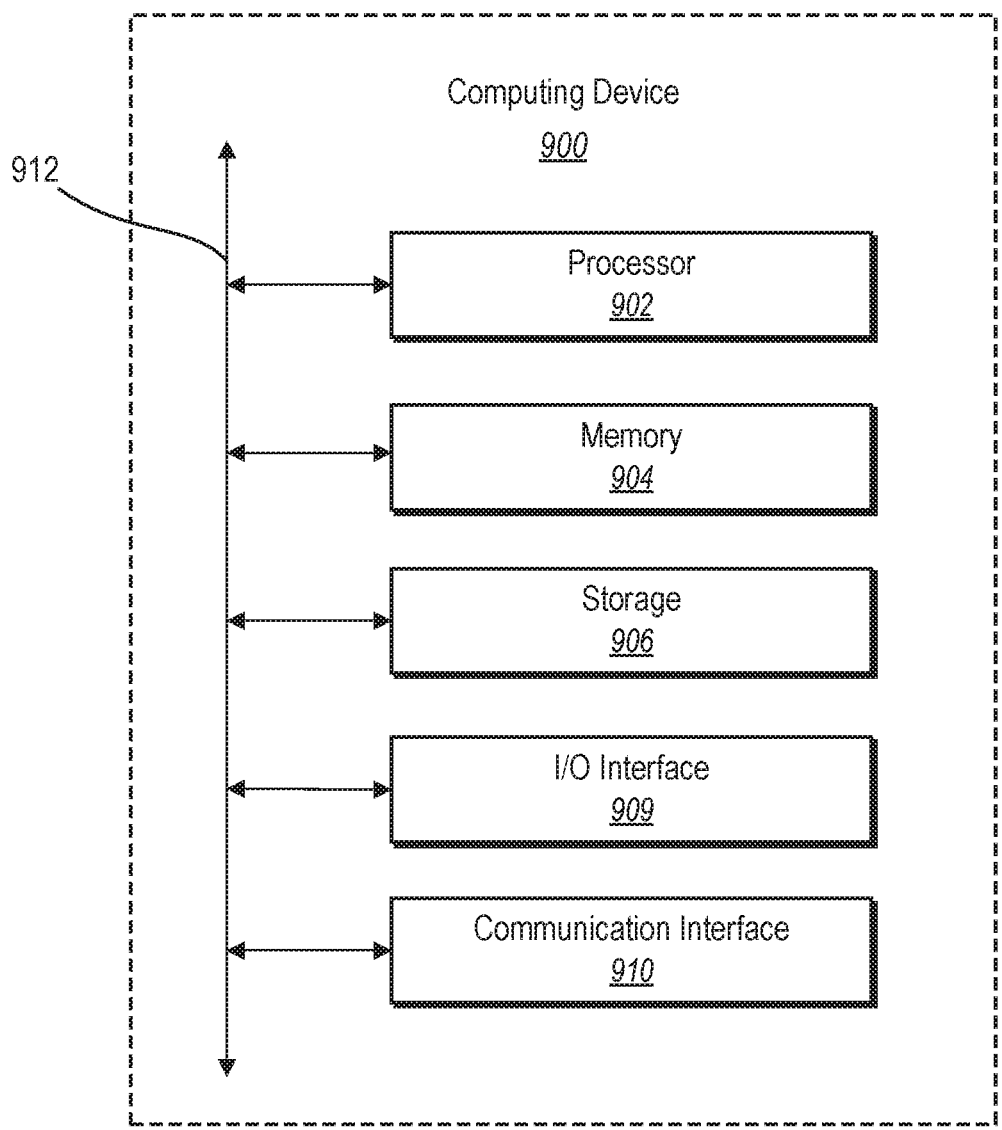
FIG. 9 illustrates a block diagram of an exemplary computing device in accordance with one or more embodiments.

FIG. 9 illustrates a block diagram of exemplary computing device 900 that may be configured to perform one or more of the processes described above. One will appreciate that one or more computing devices such as the computing device 900 may implement the price management system 102. As shown by FIG. 9, the computing device 900 can comprise a processor 902, a memory 904, a storage device 906, an I/O interface 908, and a communication interface 910, which may be communicatively coupled by way of a communication infrastructure 912. In certain embodiments, the computing device 900 can include fewer or more components than those shown in FIG. 9. Components of the computing device 900 shown in FIG. 9 will now be described in additional detail.

In one or more embodiments, the processor 902 includes hardware for executing instructions, such as those making up a computer program. As an example and not by way of limitation, to execute instructions for dynamically modifying workflows, the processor 902 may retrieve (or fetch) the instructions from an internal register, an internal cache, the memory 904, or the storage device 906 and decode and execute them. The memory 904 may be a volatile or non-volatile memory used for storing data, metadata, and programs for execution by the processor(s). The storage device 906 includes storage, such as a hard disk, flash disk drive, or other digital storage device, for storing data or instructions for performing the methods described herein.

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 910 may facilitate communications with various types of wired or wireless networks. The communication interface 910 may also facilitate communications using various communication protocols. The communication infrastructure 912 may also include hardware, software, or both that couples components of the computing device 900 to each other. For example, the communication interface 910 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
   determine an expiration date of a target product available for purchase from a merchant;
   dynamically generate discount prices for the target product over time by processing both the expiration date of the target product and customer history data of a plurality of customers associated with the merchant utilizing learned parameters of a neural network to:
   determine a plurality of probabilities of sale for the target product at a plurality of possible discount prices; and
   select the discount prices for the target product from the plurality of possible discount prices based on the plurality of probabilities of sale, the discount prices comprising a first discount price for the target product generated based on the expiration date and customer history data for a first customer associated with the merchant;
identify a client device of the first customer associated with the merchant;
detect that a location of the client device of the first customer associated with the merchant enters a geo-fence corresponding to a location of the merchant; and
provide, to a client device of a first customer associated with the merchant and based on the customer history data for the first customer, the first discount price for the target product in response to the location of the client device entering the geo-fence.

2. The non-transitory computer readable storage medium as recited in claim 1, further comprising instructions that, when executed by the at least one processor, cause the computing device to:
identify a client device of a second customer associated with the merchant, wherein the discount prices comprise a second discount price for the target product generated based on the expiration date and customer history data for the second customer; and
provide, to the client device of the second customer, the second discount price for the target product.

3. The non-transitory computer readable storage medium as recited in claim 1, wherein the first discount price for the target product corresponds to a first time window, the non-transitory computer readable storage medium further comprising instructions that, when executed by the at least one processor, cause the computing device to provide a second discount price for the target product, the second discount price corresponding to a second time window.

4. The non-transitory computer readable storage medium as recited in claim 1, further comprising instructions that, when executed by the at least one processor, cause the computing device to determine the expiration date of the target product by utilizing one or more sensors to determine a remaining shelf life of the target product, wherein the one or more sensors comprise an in-store camera or a camera on the client device of the first customer.

5. A computer-implemented method of dynamically generating discounted product digital notifications based on remaining product shelf life comprising:
determining, by at least one processor, expiration dates of a plurality of target products from a plurality of product categories available for purchase from a merchant;
dynamically generating, by the at least one processor, discount prices for the plurality of target products over time by processing both the expiration dates of the plurality of target products and customer history data of a plurality of customers associated with the merchant utilizing learned parameters of a neural network to:
determine a plurality of probabilities of sale for the plurality of target products at a plurality of possible discount prices; and
select the discount prices for the plurality of target products from the plurality of possible discount prices based on the plurality of probabilities of sale, the discount prices comprising a first discount price for a first target product generated based on a first expiration date and customer history data for a first customer;
identifying, by the at least one processor, a client device of the first customer associated with the merchant;
detecting, by the at least one processor, that a location of the client device of the first customer associated with the merchant enters a geo-fence corresponding to a location of the merchant; and
providing, to the client device of the first customer associated with the merchant and based on the customer history data for the first customer, the first discount price for the first target product in response to the location of the client device of the first customer entering the geo-fence.

6. The computer-implemented method as recited in claim 5, wherein the discount prices comprise a second discount price for the first target product based on the first expiration date and customer history data for a second customer, the computer-implemented method further comprising:
identifying a client device of the second customer associated with the merchant; and
providing, to the client device of the second customer, the second discount price for the first target product.

7. The computer-implemented method as recited in claim 5, further comprising determining the first expiration date of the first target product by utilizing one or more sensors to determine a remaining shelf life of the first target product, wherein the one or more sensors comprise an in-store camera or a camera on the client device of the first customer.

8. The computer-implemented method as recited in claim 5, wherein the customer history data comprises user data profiles associated with the plurality of customers.

9. The computer-implemented method as recited in claim 5, wherein dynamically generating the discount prices for the plurality of target products over time comprises generating, utilizing the learned parameters of the neural network, a predicted loss to the merchant for a possible discount price of the plurality of possible discount prices based on a total cost for product items of the first target product in inventory, a cost per product unit, an original price for the target product, the possible discount price as a percentage of the original price, and a probability of sale corresponding to the possible discount price.

10. The computer-implemented method as recited in claim 9, wherein dynamically generating the discount prices for the plurality of target products over time comprises generating the first discount price by selecting a possible discount price from the plurality of possible discount prices that results in a lowest predicted loss to the merchant.

11. The computer-implemented method as recited in claim 5, wherein dynamically generating the discount prices for the plurality of target products over time further comprises processing a purchase history and a price history of the plurality of products from the plurality of product categories.

12. The computer-implemented method as recited in claim 5, wherein dynamically generating the discount prices for the plurality of target products over time comprises:
dynamically generating a first plurality of discount prices for a first plurality of target products of a first product category at a first store associated with the merchant; and
dynamically generating a second plurality of discount prices for a second plurality of target products of the first product category at a second store associated with the merchant, the second plurality of discount prices being different than the first plurality of discount prices.

13. The computer-implemented method as recited in claim 5, wherein dynamically generating the discount prices for the plurality of target products over time comprises dynamically generating a plurality of discount prices based on global product history data for a plurality of stores and global customer history data for a plurality of customers associated with the merchant.

14. The computer-implemented method as recited in claim 5, wherein dynamically generating discount prices for the plurality of target products over time comprises:
generating the plurality of probabilities of sale for the plurality of target products at the plurality of possible discount prices at a plurality of times relative to the expiration dates of the plurality of target products; and
dynamically generating, based on the plurality of probabilities of sale, a pricing model comprising the discount prices for the plurality of target products at the plurality of times.

15. The computer-implemented method as recited in claim 5, wherein determining the probabilities of sale for the plurality of target products at the plurality of possible discount prices comprises:
determining a possible discount price for a target product of the plurality of target products; and
generating, based on product history data of the target product and the customer history data of the plurality of customers associated with the merchant, a probability of sale for the target product of the plurality of target products at the possible discount price at a time relative to the expiration date.

16. A system for dynamically generating discounted product digital notifications based on remaining product shelf life, comprising:
at least one processor;
a non-transitory computer memory comprising:
product history data of a plurality of products available for purchase from a merchant, the product history data comprising historical expiration dates of the plurality of products; and
customer history data of a plurality of customers associated with the merchant; and
instructions that, when executed by the at least one processor, cause the system to:
determine an expiration date of a target product available for purchase from the merchant;
generate, using a machine-learning model trained using the product history data and the customer history data, a discount price for the target product for a first customer by processing, utilizing the machine learning model, customer history data of the first customer and product data of the target product comprising an expiration date of the target product to:
determine a plurality of probabilities of sale for the target product at a plurality of possible discount prices; and
select the discount price for the target product from the plurality of possible discount prices based on the plurality of probabilities of sale;
detect that a location of a client device of the first customer associated with the merchant enters a geo-fence corresponding to a location of the merchant; and
provide, to the client device of the first customer associated with the merchant and based on the customer history data of the first customer, the generated discount price for the target product in response to the location of the client device of the first customer entering the geo-fence.

17. The system as recited in claim 16, further comprising instructions that, when executed by the at least one processor, cause the system to generate the discount price for the target product for the first customer by:
generating, utilizing the machine-learning model, predicted losses to the merchant for the plurality of possible discount prices based on a total cost for product items of the target product in inventory, a cost per product unit, an original price for the target product, the plurality of possible discount prices as percentages of the original price, and the plurality of probabilities of sale for the target product at the plurality of possible discount prices; and
generating the discount price by selecting a possible discount price from the plurality of possible discount prices that results in a lowest predicted loss to the merchant.

18. The system as recited in claim 16, wherein the customer history data of the first customer comprises:
a purchase frequency, a purchase recency, and a consumption rate in connection with a product category comprising the target product for the first customer;
demographic information for the first customer; or
a price sensitivity for the first customer.

19. The system as recited in claim 16, wherein the instructions that, when executed by the at least one processor, cause the system to generate the discount price for the target product for the first customer further cause the system to:
generate the plurality of probabilities of sale for the target product at the plurality of possible discount prices at a plurality of times relative to the expiration date of the target product; and
dynamically generate, based on the plurality of probabilities of sale, a pricing model comprising a plurality of discount prices comprising the discount price for the target product for the first customer at the plurality of times.

20. The system as recited in claim 16, further comprising instructions that, when executed by the at least one processor, cause the system to:
generate a first probability of the first customer purchasing the target product at the generated discount price;
generate a second probability of a second customer purchasing the target product at the generated discount price;
compare the first probability to the second probability; and
in response to determining that the first probability is greater than the second probability, provide, to the client device of the first customer, the generated discount price for the target product.

* * * * *